United States Patent
Sachdev

(10) Patent No.: US 10,191,693 B2
(45) Date of Patent: Jan. 29, 2019

(54) PERFORMING UPDATES ON VARIABLE-LENGTH DATA SEQUENTIALLY STORED AND INDEXED TO FACILITATE REVERSE READING

(71) Applicant: LinkedIn Corporation, Mountain View, CA (US)

(72) Inventor: Sanjay Sachdev, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 91 days.

(21) Appl. No.: 15/294,505

(22) Filed: Oct. 14, 2016

(65) Prior Publication Data

US 2018/0107419 A1     Apr. 19, 2018

(51) Int. Cl.
*G06F 3/06* (2006.01)

(52) U.S. Cl.
CPC ............ *G06F 3/0673* (2013.01); *G06F 3/064* (2013.01); *G06F 3/065* (2013.01); *G06F 3/0617* (2013.01); *G06F 3/0619* (2013.01)

(58) Field of Classification Search
CPC ........ G06F 3/0604; G06F 3/061; G06F 3/064; G06F 17/30312; G06F 3/0673; G06F 3/065; G06F 3/0617; G06F 3/0619
See application file for complete search history.

(56) References Cited

U.S. PATENT DOCUMENTS

| 5,200,864 A | 4/1993 | Dunn |
| 5,335,328 A | 8/1994 | Dunn |
| 6,487,633 B1 | 11/2002 | Horst |
| 2003/0070056 A1 | 4/2003 | Greco |
| 2003/0135495 A1 | 7/2003 | Vagnozzi |
| 2004/0024981 A1* | 2/2004 | Iwatsu ............ G11B 20/00086 711/165 |
| 2004/0057545 A1 | 3/2004 | Hayashi |

(Continued)

FOREIGN PATENT DOCUMENTS

| EP | 14272213 A1 | 6/2004 |
| WO | 200184298 A1 | 11/2001 |

OTHER PUBLICATIONS

Wikipedia: "Variable-length quantity" https://en.wikipedia.org/wiki/Variable-length_quantity, downloaded from Wikipedia Dec. 27, 2016.

*Primary Examiner* — Hiep T Nguyen

(74) *Attorney, Agent, or Firm* — Park, Vaughan, Fleming & Dowler LLP

(57) ABSTRACT

A system, method, and apparatus are provided for performing update operations on variable-length data records stored and indexed to facilitate reverse reading. Each record contains a key offset for each key field, and the key offset stores a reference (e.g., an offset) to the next most recently stored record that has the same value for the key. Key offsets of a new set of records are configured based on the data index and an assumed write location (e.g., an end offset of the data). The data repository is locked and, if no other intervening records were stored, the new ones are written, the index is updated, and the lock is released. If intervening records were stored, the new set of records is adjusted further based on the current index and the current write location, the records are stored, the index is updated, and the lock is released.

20 Claims, 12 Drawing Sheets

(56) References Cited

U.S. PATENT DOCUMENTS

| | | | |
|---|---|---|---|
| 2008/0270680 A1* | 10/2008 | Chang | G11C 16/10 |
| | | | 711/103 |
| 2012/0197900 A1 | 8/2012 | Mandre | |
| 2014/0006401 A1* | 1/2014 | Levandoski | G06F 17/30339 |
| | | | 707/737 |
| 2015/0331619 A1 | 11/2015 | Zheng | |
| 2017/0082446 A1 | 3/2017 | Long | |

* cited by examiner

PERFORMING UPDATES ON VARIABLE-LENGTH DATA SEQUENTIALLY STORED AND INDEXED TO FACILITATE REVERSE READING

RELATED APPLICATION

The subject matter of this application is related to the subject matter in: co-pending U.S. patent application Ser. No. 14/988,444, entitled "Facilitating Reverse Reading of Sequentially Stored, Variable-Length Data" and filed Jan. 5, 2016; co-pending U.S. patent application Ser. No. 15/135,402, entitled "Indexing and Sequentially Storing Variable-Length Data to Facilitate Reverse Reading" and filed Apr. 21, 2016; and co-pending U.S. patent application Ser. No. 15/191,091, entitled "Capturing Snapshots of Variable-Length Data Sequentially Stored and Indexed to Facilitate Reverse Reading" and filed Jun. 23, 2016; and co-pending U.S. patent application Ser. No. 15/227,679, entitled "Performing Set Operations on Variable-Length Data Sequentially Stored and Indexed to Facilitate Reverse Reading" and filed Aug. 3, 2016.

BACKGROUND

This disclosure relates to the field of computer systems and data storage. More particularly, a system, method, and apparatus are provided for performing concurrent updates on variable-length data that has been indexed and sequentially stored in a manner that facilitates reverse reading of the data.

Variable-length data are stored in many types of applications and computing environments. For example, events that occur on a computer system, perhaps during execution of a particular application, are often logged and stored sequentially (e.g., according to timestamps indicating when they occurred) in log files, log-structured databases, and/or other repositories. Because different information is typically recorded for different events (e.g., different system metrics or application metrics), the records often have varying lengths.

When reading the recorded data in the same order it was written, it is relatively easy to quickly navigate the data and proceed from one record to the next, to find a requested record or for some other purpose. However, when attempting to scan the data in reverse order (e.g., to find the most recent record of a particular type or matching specified criteria), the task is more difficult because the storage schemes typically are not designed to support reverse navigation or scanning.

In addition, one or more set operations (e.g., union, intersection, difference) on variable-length data that has been stored and indexed to facilitate reverse reading may be required in order to efficiently satisfy complex queries. Because the data are formatted for reverse reading, typical methods of searching for and aggregating particular data (e.g., data records that have specified values for multiple key fields) will not be efficient and may not be useful. Traditional key/value databases have not supported such operations, which prevents them from supporting some complex queries.

Further, multiple queries may target the data at the same time, possibly in the midst of write operations that change the data and/or add new data. To ensure accurate results for these operation, and/or to avoid locking the data, it may be preferable for each query to be executed against a copy or version of the data as it existed at the time of the query (e.g., to avoid tainting the data with the effect of write operations conducted after the query was received or initiated). However, making separate copies of stored data for different queries would be prohibitively expensive.

Yet further, it may be necessary to perform concurrent updates to the data, especially in environments in which the data are received from multiple sources or inputs. Even during periods of frequent updates, however, it may be desirable to ensure each update is performed atomically (e.g., an entire write operation is applied contiguously), and it may be desirable to minimize locking of the data during such updates.

DETAILED DESCRIPTION

Figure 1:
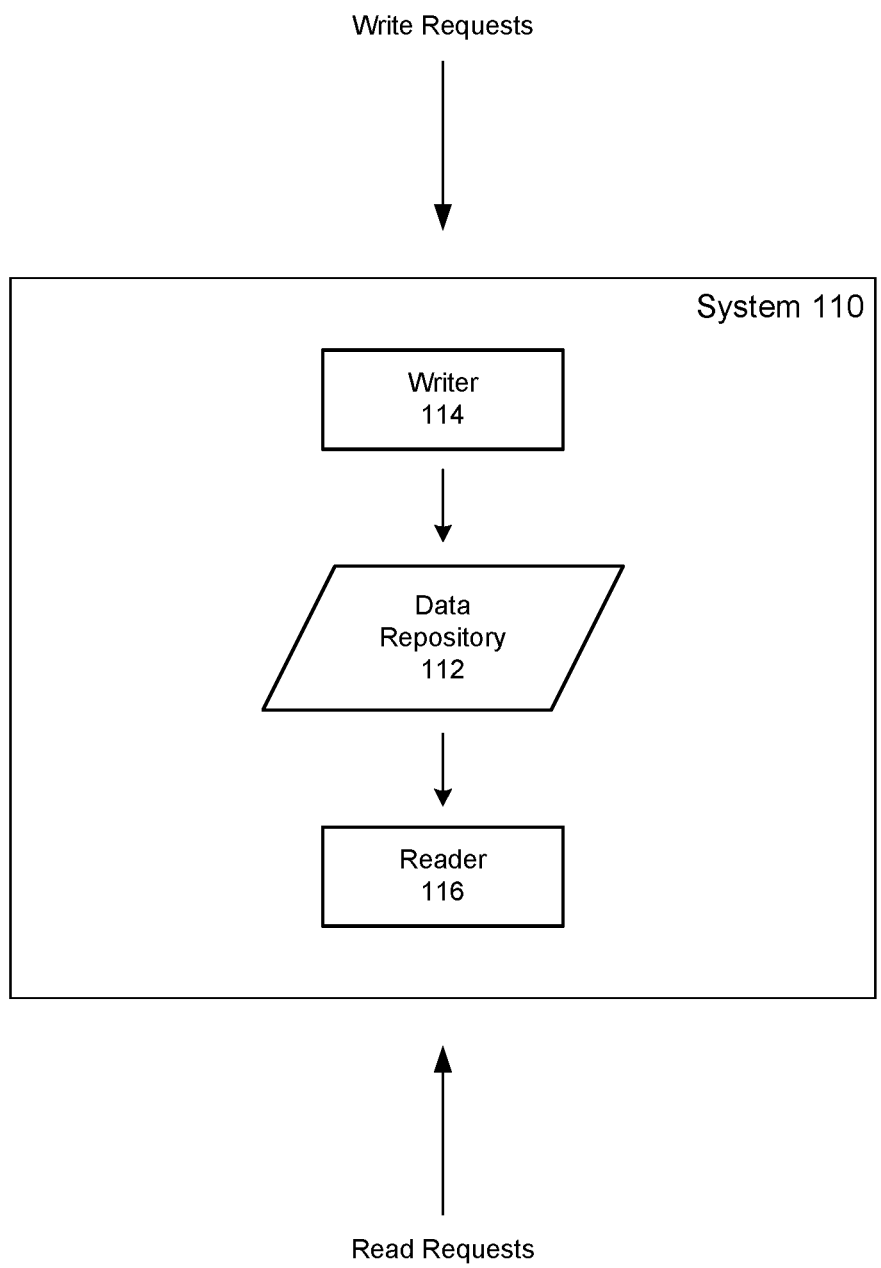
FIG. 1 is a block diagram depicting a system in which variable-length data is sequentially stored in a manner that facilitates reverse reading, in accordance with some embodiments.

The following description is presented to enable any person skilled in the art to make and use the disclosed embodiments, and is provided in the context of one or more particular applications and their requirements. Various modifications to the disclosed embodiments will be readily apparent to those skilled in the art, and the general principles defined herein may be applied to other embodiments and applications without departing from the scope of those that are disclosed. Thus, the present invention or inventions are not intended to be limited to the embodiments shown, but rather are to be accorded the widest scope consistent with the disclosure.

In some embodiments, a system, method, and apparatus are provided for facilitating reverse reading of sequentially stored variable-length data records. Reading the data in reverse means reading, scanning, or otherwise navigating through the records in the reverse order from which they were stored. Because the records are of variable lengths, there may be wide variation in the sizes of the records.

In some embodiments, a system, method, and apparatus are provided for indexing and sequentially storing variable-length data records. In these embodiments, the index is stored with the stored data and facilitates rapid key-based data retrieval.

In some embodiments, a system, method, and apparatus are provided for taking snapshots of variable-length data records that have been stored and indexed to facilitate reverse reading; the snapshots may support concurrent read operations. In these embodiments, a final record within a snapshot is identified (e.g., based on time), and the index is copied and pruned as necessary to omit records not consistent with the snapshot (e.g., to omit data records stored after a final time corresponding to the snapshot).

In some embodiments, a system, method, and apparatus are provided for performing set operations (e.g., union, intersection, difference) on variable-length data records that have been stored and indexed to facilitate reverse reading. In these embodiments, an index is used to quickly scan the data records to find records that satisfy a query involving values for multiple key fields of the data.

In some embodiments, a system, method, and apparatus are provided for performing concurrent operations (e.g., multiple write operations, a write operation and one or more read operations) on variable-length data records that have been stored and indexed to facilitate reverse reading. In these embodiments, the updates are performed atomically, and written data are stored contiguously.

Facilitating Reverse Reading of Sequentially Stored Variable-Length Data

In embodiments for facilitating reverse reading of sequentially stored variable-length data records, an efficient scheme is implemented to make it easier and faster to determine the size of a record, thereby allowing a reverse reader to quickly move to the beginning of the record in order to read the record and/or to continue the reverse reading process at the next record in reverse order.

In particular, after the record is stored in sequential order, the length of the record is stored with variable-length quantity (VLQ) encoding. With VLQ encoding, a binary representation of the record length (in bytes) is divided into 7-bit partitions. Each partition is stored in an 8-bit octet in which the most significant (or highest-order) bit indicates whether another octet follows the current one.

Specifically, if the record length requires more than one octet (i.e., at least 128 (or $2^7$) bytes were needed to store the record), every octet except the last octet, which stores the least significant bits of the record length, will have a first value (e.g., 1) as the most significant bit (MSB), while the last octet has a second value (e.g., 0) as the most significant bit. If the record length requires only one octet to store (i.e., the record is less than 128 bytes long), that length is stored with the second value (e.g., 0) as the most significant bit.

However, records that are 128 bytes long, or longer, will still be of varying lengths, and current computing systems will require up to a total of ten octets (or bytes) to store a value representing the length (or size) of a given data record. In particular, a computer or other device that features a 64-bit processor will require up to ten octets to store a 64-bit value (with each octet containing up to 7 of the 64 bits).

This scheme works fine when reading or scanning sequentially stored variable-length data records in the order in which they were stored, because each octet storing a portion of the record's length can be consumed in order and the most significant bits will indicate when the record length value is complete. However, when reading the data in reverse order, the most significant bit of the final octet in the record length (i.e., the first octet that would be encountered when reading in reverse order) will always be 0 and the reader cannot immediately determine how many octets were used to store the record length.

Therefore, in some embodiments, when a variable-length record is stored, the record's length is stored afterward with VLQ encoding, and one additional byte is conditionally formatted and stored after the record length. Specifically, if the record length was stored in one octet/byte (i.e., the record is less than 128 bytes long), which has 0 as the most significant bit, nothing further is done. However, if more than one octet/byte was required to store the record length, then one additional byte is configured and stored after the record length. This additional byte stores the size (in bytes) of the record length, and the value 1 in its most significant bit. This additional byte may be said to store a "size of the size" value, because it stores the size (or length) of the value that identifies the size (or length) of the corresponding record. The "size of the size" byte and the VLQ-encoded record length may be collectively termed 'size metadata' for the accompanying record (i.e., the record that precedes the metadata).

When reverse-reading the sequentially stored variable-length data, from the end of the collection of records (e.g., at the end-of-file marker) or at the starting location of the most recently read record, the next byte in reverse order from the current offset is read. If its most significant bit is 0, the byte stores the size of the preceding record (the next record in reverse order) and the reader can identify the beginning of the record by subtracting that size (in bytes) from its current offset. If the most significant bit is 1, the lower seven bits identify the size of the record length value (in bytes). By subtracting that size from the current offset, the reader can identify the start of the VLQ-encoded record length. The record length can then be read to identify the length of the record (in bytes), which can be subtracted from the offset of the start of the VLQ-encoded record length to find the start of the record.

FIG. 1 is a block diagram depicting a system in which variable-length data is sequentially stored in a manner that facilitates reverse reading, in accordance with some embodiments.

System 110 of FIG. 1 includes data repository 112, which may be a log-structured database, a sequential log file, or some other entity. Of note, the repository specifically stores variable-length records in sequential manner (e.g., based on timestamps and/or other indicia). The records may contain different types of data in different implementations, without exceeding the scope of embodiments described herein.

System 110 also includes writer 114 and reader 116. Writer 114 writes new records to data repository 112 in response to write requests, with each new record being stored (immediately) after the previously stored record. Reader 116 traverses (e.g., and reads) records in reverse order from the data repository in response to read requests. Reader 116 may also traverse, navigate, and/or read records in the order in which they are stored, but in current embodiments the reader frequently or regularly is tasked to reverse-navigate the stored data. The reader may navigate the stored data (in either direction) not only to search for one or more desired records, but also to construct (or help construct) an index, linked list, or other structure, or for some other purpose (e.g., to purge stale data, to compress the stored data). Writer 114 and reader 116 may be separate code blocks, computer processes, or other logic entities, or may be separate portions of a single entity.

Write requests and read requests may be received from various entities, including computing devices co-located with and/or separate from system 110, other processes (e.g., applications, services) executing on the same computer system(s) that include system 110, and/or other entities.

For example, system 110 of FIG. 1 may be part of a data center or other cooperative collection of computing resources, and include additional or different components in different embodiments. Thus, the system may include storage components other than data repository 112, and may include processing components, communication resources, and so on. Although only a single instance of a particular component of system 110 may be illustrated in FIG. 1, it should be understood that multiple instances of some or all components may be employed. In particular, system 110 may be replicated within a given computing environment, and/or multiple instances of a component of the system may be employed.

Figure 2A:
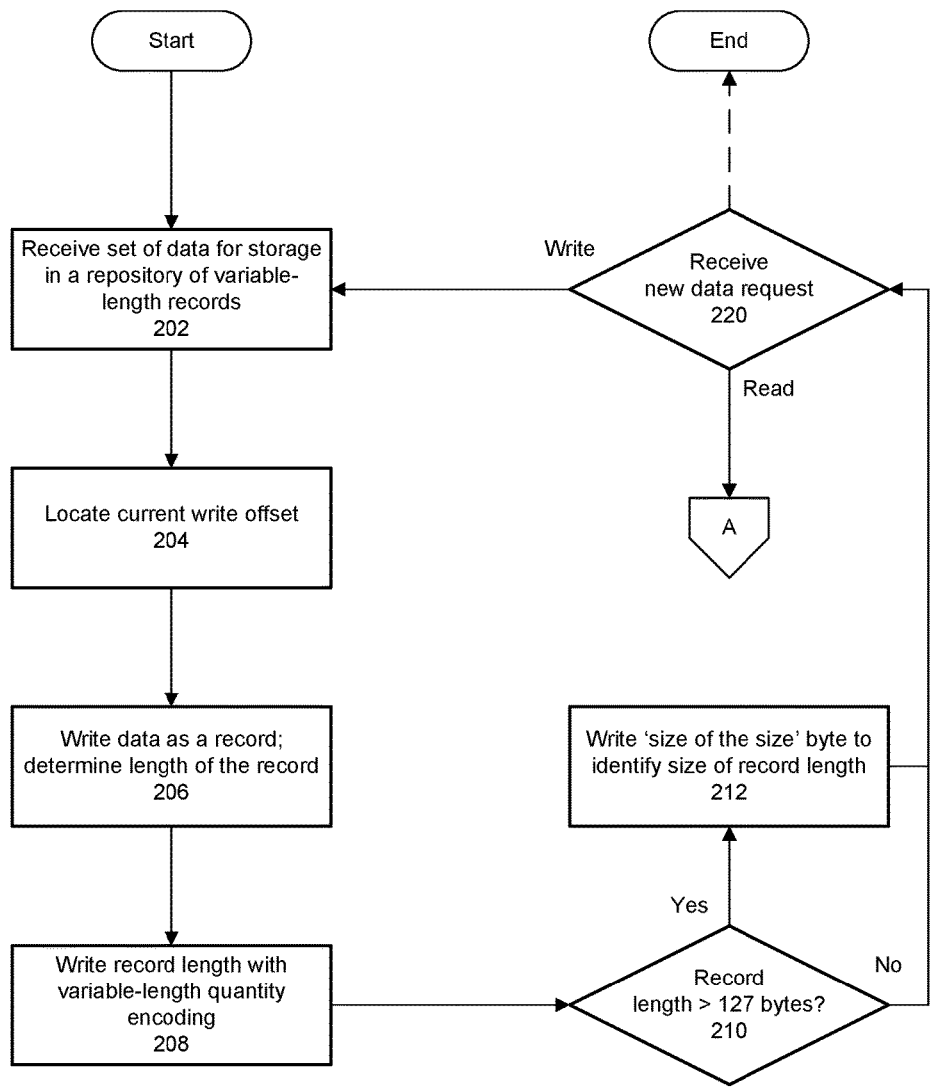
FIGS. 2A-B comprise a flow chart illustrating a method of facilitating reverse reading of sequentially stored variable-length data, in accordance with some embodiments.
Figure 2B:
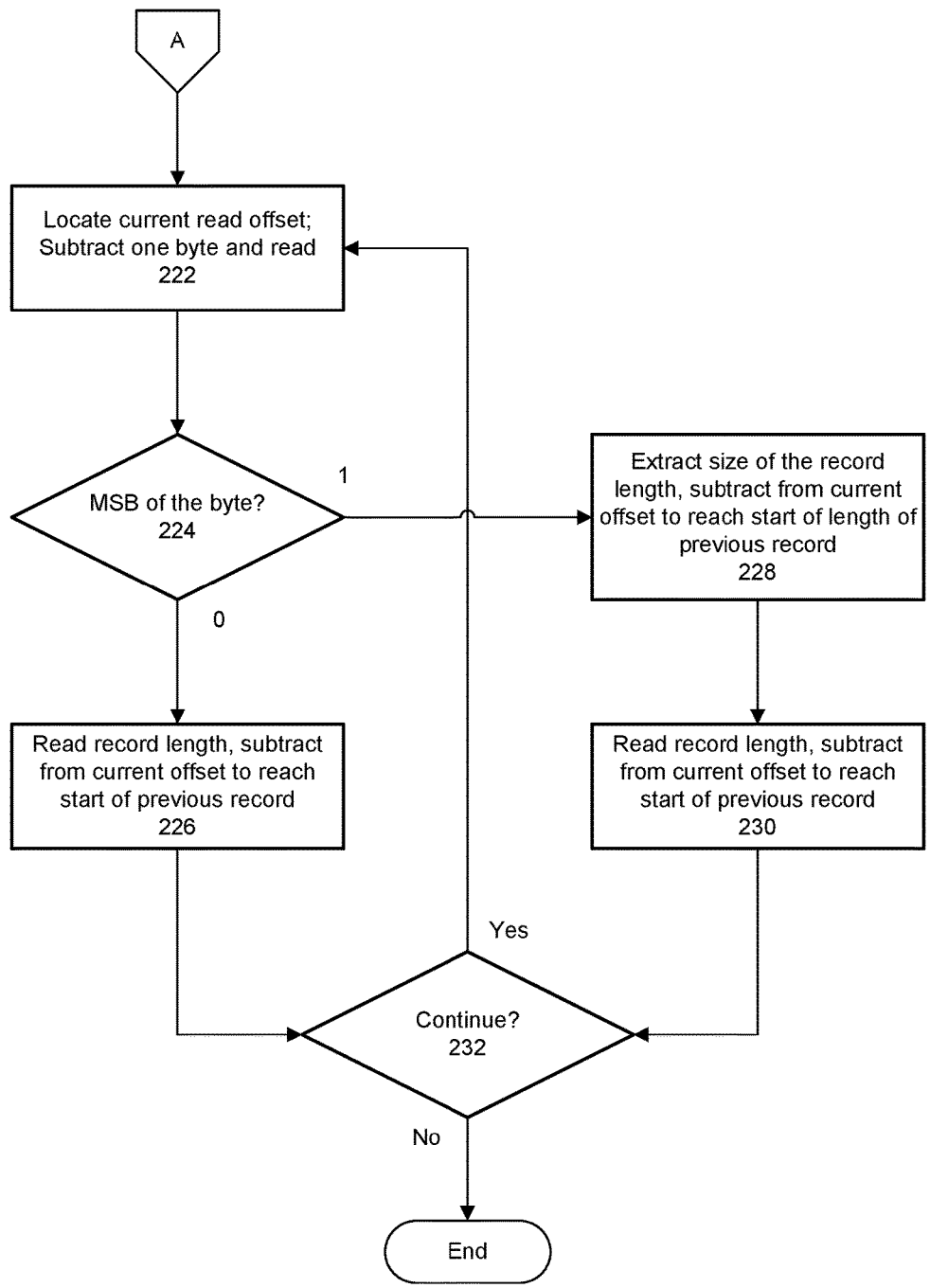

FIGS. 2A-B comprise a flow chart illustrating a method of facilitating reverse reading of sequentially stored variable-length data, according to some embodiments. In other embodiments, one or more of the illustrated operations may be omitted, repeated, and/or performed in a different order. Accordingly, the specific arrangement of steps shown in FIG. 2 should not be construed as limiting the scope of the embodiments.

In these embodiments, one or more data repositories (e.g., databases, files or file systems) sequentially store the variable-length data as individual records, each of which has a corresponding length (or size) that can be measured in terms of bytes (or other units). The manner in which the records are stored facilitates their reading in reverse order, and the manner in which they are reverse-read (i.e., read in reverse order) depends on how they are stored.

In operation 202 of the illustrated method, a new set of data is received for storage. If not already in a form to be stored, it may be assembled into a record, which may involve compressing the data, encoding or decoding it, encrypting or decrypting it, and/or some other pre-processing. In some implementations, no pre-processing is required because the data can be stored in the same form in which it is received.

In operation 204, the end of the previously stored record is identified (including associated size metadata), which may be readily available in the form of a pointer or other reference that identifies a current write offset within the data repository. If the data are to be stored in a new data repository that contains no other records, this current write offset may be the first storage location of the repository.

In operation 206, the data are written with suitable encoding, which may vary from one implementation to another. Before, after, or as the data are written, the length of the written data record is determined (e.g., as a number of bytes occupied by the record).

In operation 208, the record length is written with variable-length quantity (VLQ) encoding, which is described above. Specifically, the binary representation of the record length is divided into 7-bit groups, starting from the least significant bit, so that if the length is 128 bytes or greater (i.e., length $\geq 2^7$) only the group containing the most significant bits may contain less than 7 bits, which is padded with zeros to form a 7-bit group.

Each 7-bit group is stored after the data record in a separate octet (or byte), in order, from the most significant to least significant. The most significant bits (or sign bits) of all but the last (least significant) octet are set to 1 to indicate, when the record length is read in the same order in which it was written, that there is at least one more octet to be read in order to assemble the record length. The most significant bit of the last octet is set to 0 to indicate that it is the final portion of the record length. Similarly, if the record length is less than 128 bytes, and can be stored in a single octet, the most significant bit of that octet is set to 0.

In some alternative embodiments, however, the order of the octets is reversed so that the least significant octet is written first and the most significant octet is written last. In these embodiments, the most significant bits of the octets are coded in the same manner. That is, when multiple octets are written, the most significant bits in all but the final octet are 1, while the most significant bit of the final octet (or the only octet, if only one is required) is 0.

In operation 210, the data writer (e.g., writer 112 of system 110 of FIG. 1) or a process/entity that controls the writer determines whether the record length was 128 bytes or more or, in other words, whether more than one octet or byte was used to store the record length. If so, the method continues at operation 212; otherwise, the method advances to operation 220.

In operation 212, the 'size of the size', or the number of bytes needed to store the record length, is stored in the least significant bits of an additional octet/byte, and the value 1 is stored in the most significant bit. Because this 'size of the size' byte can store a value of up to 127 (in base-10), it can report a record length of up to 127 bytes, which corresponds to a record that is far larger than existing computer architectures can (or need to) accommodate (i.e., $2^{(127 \times 7)} - 1$).

In operation 220, a new data request is received—either a request to store a new set of data or a request to retrieve a previously stored set of data. If the request is a write request, the method returns to operation 202; if the request is a read request, the method advances to operation 222 (FIG. 2B). In some embodiments, such as when separate processes handle the different types of data requests, some operations may be handled in parallel.

In operation 222, the current read offset is identified or located (e.g., with a read pointer), which may be the end of the size metadata of the final record that was stored in the repository, or the end of some other set of size metadata. The value of one byte is subtracted from the current offset and that byte (which is the final byte of the size metadata of the previous or preceding record in the repository) is read.

In operation 224, the most significant bit of the current byte is identified. If the MSB has the value 0, the method continues at operation 226; otherwise, the method advances to operation 228.

In operation 226, the current byte stores the length (or size) of the preceding record (the 'next' record in reverse order), in bytes, and that value (up to 127 in decimal notation) is subtracted from the current offset in order to reach the start of the preceding record. The method then advances to operation 232.

In operation 228, the lower 7 bits of the current byte are extracted, which store the size of the length of the preceding record, in bytes. That value (up to 127 in decimal notation) is subtracted from the current read offset to identify the offset of the VLQ-encoded record length.

In operation 230, the record length is read and subtracted from the current offset to identify and reach the start of the preceding record (which makes it the 'current' record).

In operation 232, if the reverse navigation/traversal of the data records is finished (e.g., the current record is the last/only record sought in the read request), the method ends or returns to a previous operation (e.g., operation 220 to receive a new data request). Otherwise, the method returns to operation 222 to locate the start of the previous record.

Figure 3:
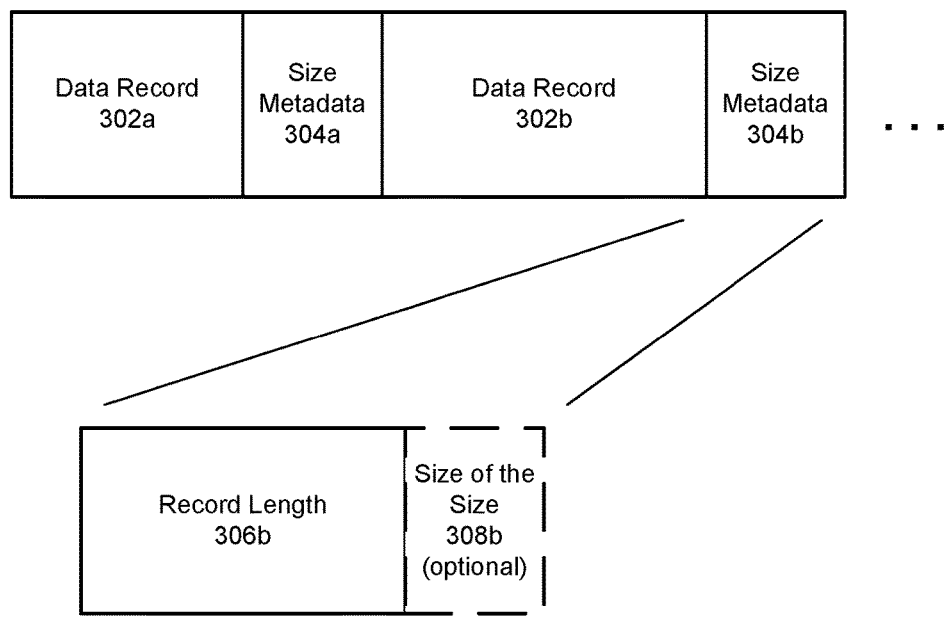
FIG. 3 is a block diagram depicting sequential storing of variable-length data to facilitate reverse reading, in accordance with some embodiments.

FIG. 3 is a block diagram depicting sequential storing of variable-length data to facilitate reverse reading, according to some embodiments.

In these embodiments, data records 302 (e.g., records 302a, 302b) have varying lengths (or sizes), and are stored sequentially with accompanying size metadata 304 (e.g., metadata 304a, 304b). Any number of records (and corresponding size metadata) may be stored, and the repository of the data may be a text file, a log-structured database, or have some other form, and may reside on a magnetic or optical disk, a flash drive, a solid state drive, or some other hardware.

Illustrative size metadata 304b includes record length 306b, which identifies the length (e.g., in bytes) of corresponding data record 302b, and optional size of the size 308b, which, if present, identifies the size (or length) of record length 306b (e.g., in bytes).

As discussed above, in some embodiments, a size of the size value (e.g., size of the size 308b) is only added to the size metadata when the record length value is at least 128 bytes; representing the value therefore requires two or more bytes or octets of variable-length quantity encoding, which comprise record length 306b.

Storing and Indexing Sequentially Stored Variable-Length Data

In embodiments for indexing and sequentially storing variable-length data records, an index facilitates rapid key-based data retrieval. In some implementations, the index is stored separate from the database, file, log, or other repository that stores the data, and can be readily constructed or reconstructed by scanning the repository; in some other implementations it is stored with the data. As discussed above, the manner in which the data are stored facilitates reverse-scanning, so that the most recently stored records can be read first.

Within the repository, each data record includes some number of key fields (e.g., one or more), with each key having some number of possible values (e.g., two or more). For each possible value for each key field, the index stores offsets, pointers, or other references to a record (e.g., the most recently stored record) that includes that value for the corresponding key. That record (and every other stored record) includes, for each key field, an offset or other reference to another record (e.g., the next-most recently stored record) that has the same value for that key field. The index thus identifies a first record having each value of each key, and that record identifies a subsequent record having the same value for that key, and also identifies subsequent records having the values of its other key fields. Each subsequent record identifies yet other records having the same values for its key fields, and so on.

If no record in the repository has a given value for a given key, the index will store a predetermined value (e.g., null, zero). Similarly, for the last record (e.g., the oldest record) that has the given value for the key, the key's corresponding offset will have that same predetermined value.

Figure 4:
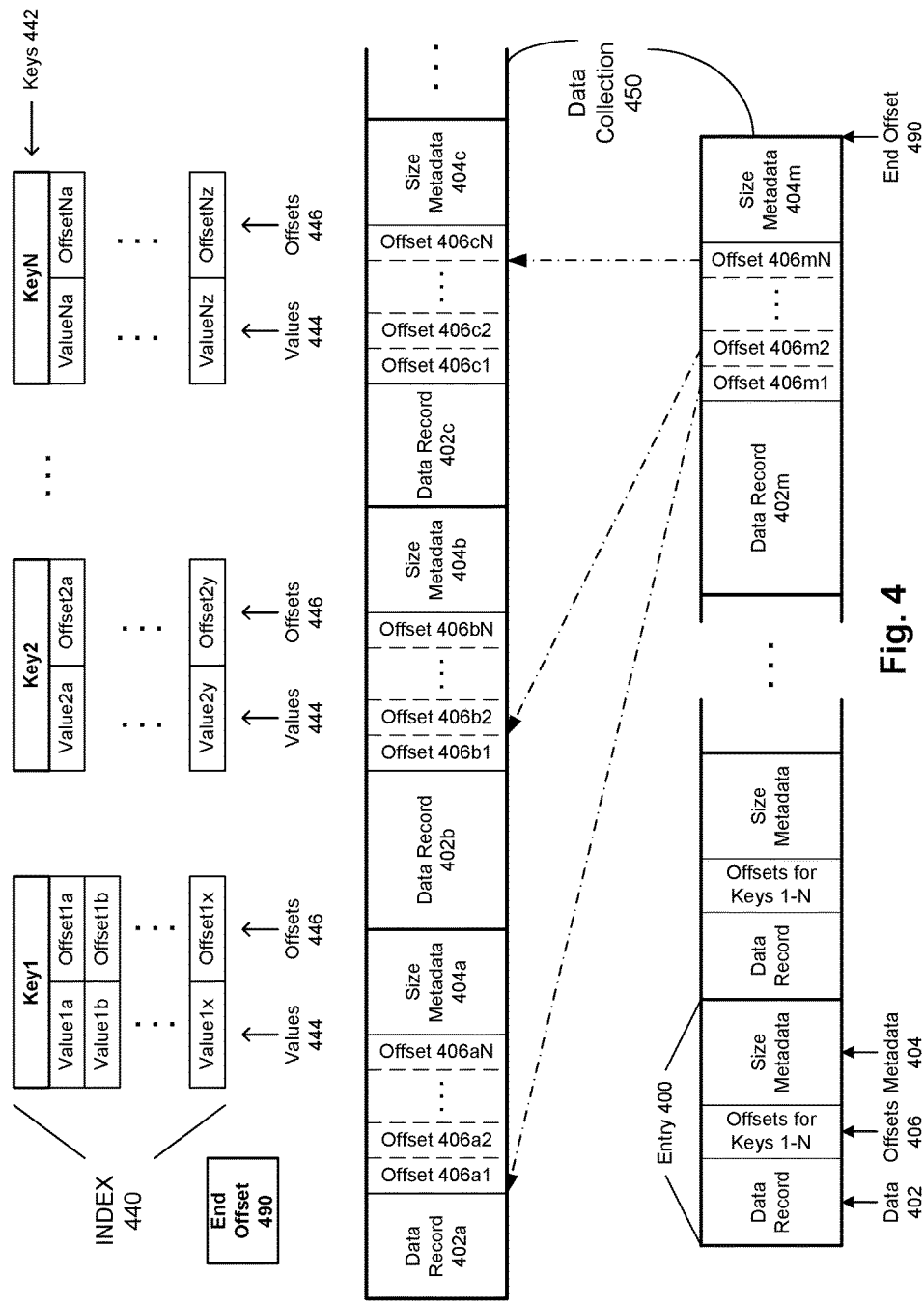
FIG. 4 is a block diagram depicting indexed storage of variable-length data to facilitate reverse reading, in accordance with some embodiments.

FIG. 4 is a block diagram depicting indexed storage of variable-length data so as to facilitate reverse reading, according to some embodiments. In these embodiments, data are stored as records within data collection 450, which may be a file, a database, or have some other form or structure. Index 440 is associated with data collection 450.

Index 440 includes information for each of N keys 442 (or key fields) included in every data record. A given key in a given record may be a substantive value or may be null (or some other predetermined value) to indicate that it has no value for that record.

For each key 442, index 440 comprises a table (e.g., a hash table), list, or other structure that identifies values 444 of the key and corresponding offsets 446 to first (e.g., most recently stored) records having the values. Thus, for each value for each of the N keys, index 440 identifies (via an offset) a first record having a given value for a given key. As indicated above, if no record in data collection 450 includes a particular value 444 for a particular key 442, the corresponding offset 446 will be null or some other predetermined value (e.g., 0).

It may be noted that index information for a particular key 442 may be initialized at the time index 440 is created if all values for the key are known, or the index information (e.g., a table corresponding to the particular key) may be appended to as new values are encountered (e.g., as new data records are stored). For example, if the particular key corresponds to days of the week, then all seven values are known ahead of time. By way of contrast, for a key that corresponds to identifiers of members of a user community, new values will be continually encountered.

Illustrative entry 400 in data collection 450 comprises data portion 402 that stores a data record, metadata portion 404 that stores size metadata, and an offsets portion 406 that stores offsets to subsequent entries or data records. Similarly, the entry containing or associated with data record 402a includes the data record, size metadata 404a, and offsets 406a (offsets 406a1-406aN). Further, data record 402b has associated size metadata 404b and offsets 406b (offsets 406b1-406bN), data record 402c has associated size metadata 404c and offsets 406c (offsets 406c1-406cN), and the entry containing data record 402m also comprises size metadata 404m and offsets 406m (offsets 406m1-406mN).

Data records 402 in FIG. 4 may be stored in a similar or identical fashion to data records depicted in FIG. 3 (e.g., records 302a, 302b). For example, a record or other set of data may be stored as it is received at a database or other entity configured to write data to data collection 450. Size metadata 404 in FIG. 4 may be stored in a similar or identical fashion to size metadata depicted in FIG. 3 (e.g., size metadata 304a, 304b). In particular, size metadata in data collection 450 may comprise 'size of size' values that assist reverse navigation through data collection 450. Individual key offsets within offsets portion 406 of an entry may be stored in the same or similar manner to size metadata 404 (e.g., with variable-length encoding, with 'size of the size' bits).

With each entry of data collection 450, offsets portion 406 includes the same number of offsets, each one corresponding to one of keys 442. Thus, for N keys, each offset portion 406 includes N offsets. The order of offsets within offsets portions 406 may or may not match the order of keys 442 in index 440, but the offsets are stored in the same order among all offset portions 406 in data collection 450. This order is known to (e.g., may be programmed into) processes that scan, navigate, read from, write to, or otherwise traverse the data collection (e.g., to respond to queries, to store new data).

To aid the description of embodiments disclosed herein, offsets within an offsets portion 406 of an entry of data collection 450 may be termed 'key offsets,' while offsets 446 of index 440 may be termed 'index offsets'.

In some implementations, both index offsets 446 and key offsets 406 are absolute offsets (i.e., from the start of data collection 450 or the start of a file or other structure that includes collection 450). In other implementations, both types of offsets are relative offsets. In yet other implementations, some offsets (e.g., index offsets) are absolute while others (e.g., key offsets) are relative.

Illustratively, when an index offset 446 is a relative offset, it may be measured from the start, the end, or some other point of index 440, or from the storage location of the index offset. When a key offset 406 in an entry in data collection 450 is a relative offset, it may be measured from the start of the entry, the start of the key offset, or some other point.

An offset (an index offset or a key offset) may identify the starting point (e.g., byte) of a target entry (e.g., the first byte of the entry's data record), the starting point of the offsets portion within a target entry, or the starting point of a specific key offset within a target entry. In the latter scenario, a scan or traversal of data collection 450 for some or all records having a particular value for a particular key can quickly navigate pertinent records by finding a first index offset 446 (for the particular value 444 of particular key 442), using that to identify a corresponding key offset 406 (for the same key) within a first entry, and thereafter following a sequence of key offsets in different entries to identify the records.

This is partially illustrated in FIG. 4, wherein three key offsets 406 (i.e., offsets 406m1, 406m2, 406mN) associated with data record 402m correspond to values for three keys 442 (i.e., keys 1, 2, and N). Because data record 402m is the last record (e.g., the most recently stored record) in collection 450, the values that keys 1, 2, and N carry within record 402m will be stored among values 444, and their corresponding offsets 446 will reference (i.e., be offsets to) key offsets 406m1, 406m2, and 406mN.

Similarly, key offsets 406m1, 406m2, 406mN for data record 402m are offsets to corresponding key offsets of other entries in collection 450. Thus, key offset 406m1 is an offset to key offset 406a1 (associated with data record 402a), key offset 406m2 is an offset to key offset 406b2 (associated with data record 402b), and key offset 406mN is an offset to key offset 406cN (associated with data record 402c).

The indexing and storage scheme depicted in FIG. 4 thus facilitates forward or reverse reading or scanning (using size metadata as described in a previous section for reverse navigation), as well as rapid access to some or all data entries having a specific value for a specific key field (using the corresponding index offset and key offsets).

In some embodiments, index 440 includes or is accompanied by metadata pertaining to data collection 450. For example, the metadata may include a measure of the size of data collection 450, a number of records stored in the collection, a starting address of the collection and/or, as shown in FIG. 4, end offset 490, which identifies the end of the data collection and the next offset location that will be written to (e.g., when a new data record is stored).

In some embodiments, the term 'record' or 'data record' may encompass an entire entry in data collection 450, including the data and offsets portions, and possibly also encompassing the metadata portion. Thus, a reference (e.g., an offset) to a data record may comprise a reference to any portion of the entry that comprises the data record.

Figure 5:
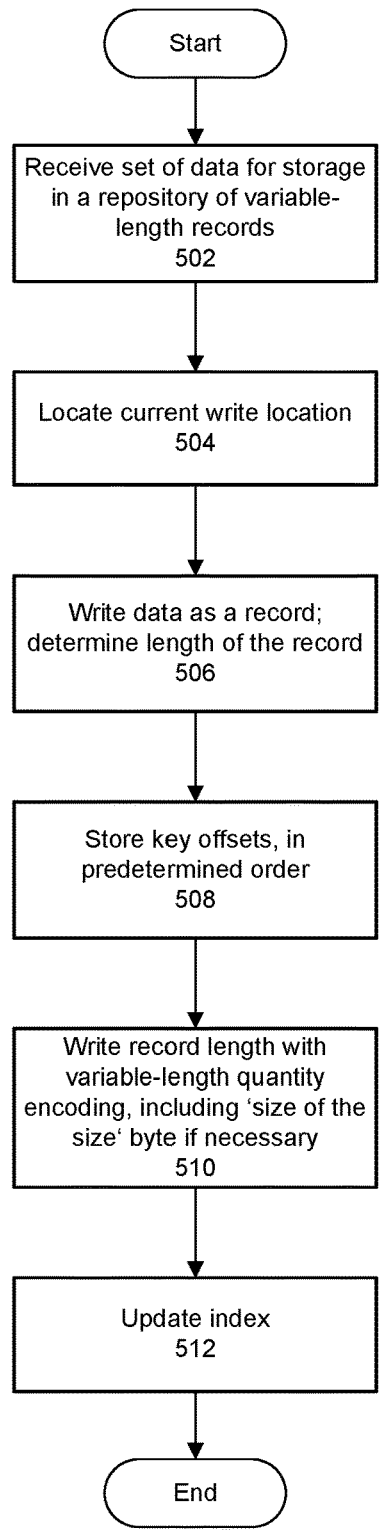
FIG. 5 is a flow chart illustrating a method of appending a new entry to a data repository of sequentially stored, variable-length data, in accordance with some embodiments.

FIG. 5 is a flow chart illustrating a method of appending a new entry to an existing repository of sequentially stored, variable-length data, such as data collection 450 of FIG. 4, according to some embodiments. In other embodiments, one or more of the illustrated operations may be omitted, repeated, and/or performed in a different order. Accordingly, the specific arrangement of steps shown in FIG. 5 should not be construed as limiting the scope of the embodiments.

In operation 502, a set of data is received for storage. The data may be stored as is, meaning that the set of data is a complete data record (such as one of data records 402 of FIG. 4), or may be configured or formatted if necessary or desired (e.g., to encrypt or decrypt it, to apply some encoding) to form a data record.

For the value of each key field of the data record, the index associated with the data repository is scanned to identify the corresponding index offsets. For key values identified in the index but not represented in previously stored data, the index offset will be a predetermined value (e.g., null, 0). If the data record includes a new value for a given key, the value is added to the index.

In operation 504, the current write location within the data repository is identified (e.g., using a write pointer or write offset such as end offset 490 of FIG. 4), and will be updated when the entry is complete.

In operation 506, the data record is written at the current write location. The size of the data record may be determined at this time, to assist in configuration of the size metadata.

In operation 508, immediately following the data record, the index offsets read from the index are stored in a predetermined order as key offsets (e.g., the order of the keys in the index, some other specified order). In some implementations, the index offsets may be converted in some way prior to being stored as key offsets. For example, if the index offsets are absolute offsets, they may be converted to relative offsets based on the starting points (e.g., bytes) of the key offsets before the key offsets are written.

In operation 510, the record length (i.e., the entry's size metadata) is written following the last key offset, in the same or a similar manner as discussed in the previous section. This operation may therefore include determining whether a 'size of the size' byte is needed, and including that byte in the record length if it is required.

For the purpose of measuring the size of a data record, the key offsets may be considered part of the record. In this case, when the size metadata is later read, it directly identifies (an offset to) the start of the data record. In some implementations, however, the key offsets may not be considered part of the data record for the purpose of computing the size metadata. Because the number of key offsets is known (i.e., the number of key fields in every data record), and their sizes may be predetermined, the storage space occupied by the key offsets can be easily computed and accounted for when (reverse) scanning entries in the data repository.

Thus, key offsets may be of fixed size, which may be determined by the size (or a maximum size) of the data repository. As one alternative, key offsets may be formatted and stored in the same manner as size metadata portions of entries illustrated in FIGS. 3 and/or 4 (e.g., with variable-length encoding).

In operation 512 the index is updated. Specifically, for each key value of the data record, the corresponding index offset is updated to store an offset to the corresponding key offset of the data record's entry in the data repository. In addition, an end offset or other value identifying the end of the repository (and/or the next offset to be written to) may be updated.

Although the method of FIG. 5 assumes one or more entries were previously stored in the data repository, a method of storing a first entry in an empty or new data repository may be readily derived from the preceding discussion. Illustratively, the entry would be stored at a first storage location in the repository (formatted as indicated above), and an index would be created or initialized based on values of the key fields of the data record and offsets to the entry (or to key field offsets within the entry).

Figure 6:
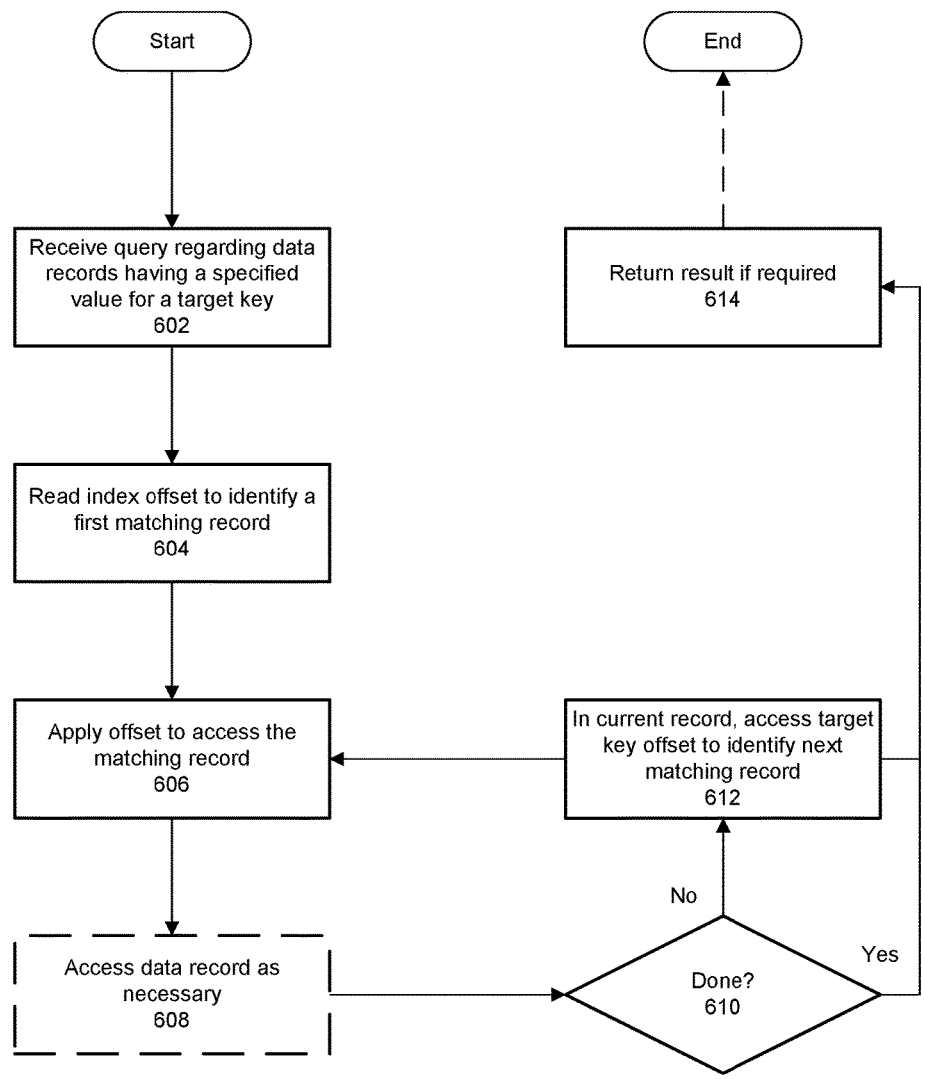
FIG. 6 is a flow chart illustrating a method of retrieving one or more sequentially stored variable-length records having a particular key value, in accordance with some embodiments.

FIG. 6 is a flow chart illustrating a method of retrieving one or more sequentially stored variable-length records having a particular key value, according to some embodiments. In other embodiments, one or more of the illustrated operations may be omitted, repeated, and/or performed in a different order. Accordingly, the specific arrangement of steps shown in FIG. 6 should not be construed as limiting the scope of the embodiments.

In operation 602, a query is received regarding one or more records, within a data repository, that have a particular value for a specified or target key. For example, some number of records may be desired that pertain to a particular member of a user community; that have timestamps that include the same month, day, hour or other time period; that reference a content item having a particular identifier; etc.

In operation 604 the index for the data repository is consulted to identify, for the specified value for the target key, an index offset to a first matching record (e.g., the most recently stored matching record).

In operation 606, the index offset is used or applied to locate the matching record/entry in the data repository. In some embodiments, for example, the index offset may identify the starting point of the data record (i.e., the data portion of the entry); in other embodiments, it may identify the start of the target key offset (i.e., the key offset corresponding to the target key); in yet other embodiments it may identify some other portion of the matching data record's entry.

In optional operation 608, the data record may be accessed if necessary or desired. For example, the query may request some portion of the data of matching data records. Conversely, simply a count of matching records may be desired, in which case the data record may not need to be read.

If the data record does need to be read, and the offset that led to the current record identified the start of the target key offset, in the illustrated method the rest of the key offsets after the target key offset are skipped to access the entry's size metadata, which are applied as described in the previous section to access the start of the data record.

In operation 610, a determination is made as to whether the search/navigation is complete. Illustratively, if only a subset of all matching records was required (e.g., a specified number of records, all records within some time period or matching other criteria), the search may be complete and the method advances to operation 614.

Otherwise, if the search is not complete, in operation 612 the target key offset of the current matching record is read to obtain an offset to a next matching record (e.g., the next most recently stored matching record), and the method then returns to operation 606.

In operation 614, a result is returned if necessary or required, which may include data extracted from one or more matching records, a count of some or all matching records, and/or other information.

It may be noted that if the index for the data repository is not available or is inaccessible, the format in which data are stored allows rapid key value-based retrieval of records. In particular, the size metadata of entries in the repository facilitates reverse-scanning of the entries until a first (most recent) entry having the target key value is found, after which the key offsets of matching entries can be quickly traversed. Similarly, the index can be readily reconstructed by reverse-scanning the data to find active values for the key field(s).

Capturing Snapshots of Variable-Length Data Sequentially Stored and Indexed to Facilitate Reverse Reading In embodiments for capturing snapshots, an efficient scheme is implemented to provide data consistency for each separate query executed on the stored data, without having to create or maintain copies of the data. In these embodiments, the data are stored and indexed as discussed in previous sections, and query-specific copies of the data index or a portion of the data index (e.g., the index illustrated in FIG. 4) may be created as needed, possibly depending upon the query.

For example, for a complex query that requires looking up data for multiple keys and/or multiple values of each key, creating a snapshot for the query may involve creation of a copy of the data index that is consistent with the parameters of the query (e.g., regarding a date range or other time interval, regarding a particular set of data records). This may involve copying the entire index and pruning it to remove references to data records that are inconsistent with the query parameters (e.g., outside the date range, not part of the target set of records).

As another example, for a query that is less complex, such as one that seeks records corresponding to a relatively low number of keys or key values, capturing a snapshot may involve incrementally creating a copy or version of the index that is consistent with the query parameters (e.g., incrementally copying portions of the index needed as the query progresses). For an even simpler query, such as one that seeks only a single data record, a snapshot may employ only a virtual copy or version of index, meaning that the live index is used to perform the query instead of creating a separate copy.

In these embodiments, a snapshot not only supports execution of one or more queries, but may also (or instead) be used to perform a rollback of the stored data. For example, if it is determined that the data was corrupted as of a certain time or after a particular record was stored, a snapshot may be created to capture the data configuration at (or before) that time, and then may be used to roll back the data to eliminate later (and possibly corrupt) data records.

Figure 7:
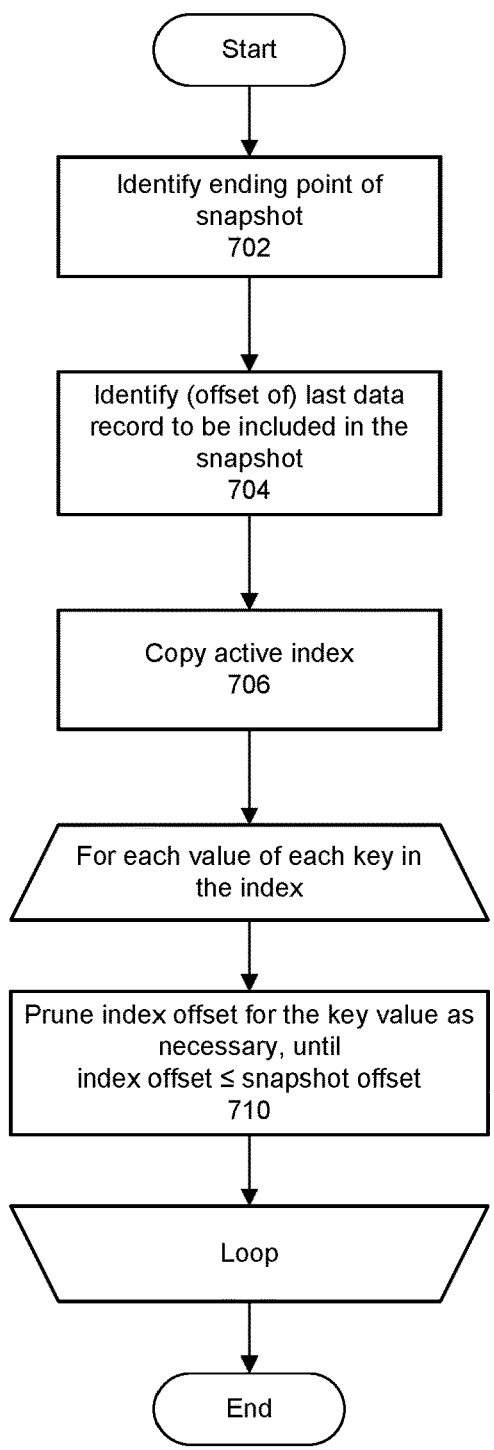
FIG. 7 is a flow chart illustrating a method of capturing a snapshot of variable-length data records stored and indexed for reverse reading, in accordance with some embodiments.

FIG. 7 is a flow chart illustrating a method of capturing a snapshot of variable-length data records stored and indexed for reverse reading, according to some embodiments. In one or more embodiments, one or more of the steps may be omitted, repeated, and/or performed in a different order. Accordingly, the specific arrangement of steps shown in FIG. 7 should not be construed as limiting the scope of the embodiments.

The illustrated method may be used in environments in which the variable-length data is stored and indexed as discussed above in conjunction with FIGS. 3 and 4, and reference may be made to these figures to aid the description. As indicated above, the snapshot may be necessary (or helpful) during execution of one or more queries or may help perform a data rollback, or may be done for some other purpose (e.g., to facilitate a backup operation).

In operation 702, an ending point of the snapshot is identified, such as an offset into the data collection, a time, or a specific data record. For example, if a snapshot is desired as of a specific time on a particular date, the ending point will be that time/date, and the last data record stored as of that time/date can be readily determined (e.g., by timestamp, by the location of a write pointer as of the time/date). As another example, if the snapshot is desired in conjunction with a particular data record or an event that can be associated with a particular record (e.g., storage of a record having a particular set of key values), the ending point will be that data record.

In operation 704, the last data record to be included in the snapshot is identified, using its offset within data collection 450, for example. For clarification and to avoid confusion with other offsets used herein (e.g., index offsets, key offsets), the offset of the last data record to include in the snapshot may be referred to as the snapshot offset. The end offset of the data repository (if such an offset is maintained) may be used as the snapshot offset when the snapshot is to include the most recently stored data entry.

Depending on the amount of time that has elapsed since the time/date or the event associated with the end of the snapshot, any number of data records (i.e., zero or more) may follow the snapshot's final data record in data collection 450. Thus, the older the ending time/date of the snapshot, the more records will have been added to the data collection after the snapshot offset.

In operation 706, a copy of the live index (e.g., index 440 for data collection 450) is made. If the snapshot can be limited to a particular set of keys (e.g., in order to facilitate a set of queries that use those keys and no others), the copy may be limited accordingly. It may be noted that the index need not be locked during this copy operation. Through the pruning process discussed below, any inconsistencies in the index due to changes made after the ending point or time of the snapshot will be removed.

Then, for each value 444 of each key 442 in the index, in operation 710 a pruning operation is conducted if/as necessary, to ensure that each corresponding index offset 446 identifies a data record within the snapshot. More specifically, each offset 446 is examined to determine if the offset is before (e.g., earlier than) or equal to the snapshot offset. If so, processing of the current key value is terminated and the processing proceeds to the next key value via a loop.

If, however, the index offset is beyond (e.g., past, later than) the snapshot offset, the record identified by the index offset is visited in order to read key offset 406 for the key value and thereby identify or locate the previous record that has the same value for the same key. That key offset may replace the index offset in the copy of the index, but it is also compared with the snapshot offset to determine if further pruning (and reverse traversal of the data collection) is required. Eventually, a record that has the key value and that is included in the snapshot is identified, and the index offset in the index copy is configured to identify that record. In this manner, each index offset is pruned to identify a latest or most recent data record that belongs in the snapshot.

In the method of FIG. 7, some or all offsets (e.g., snapshot offset, index offsets, key offsets, end offset) are absolute offsets, thereby promoting rapid comparison of record locations to facilitate the pruning operation(s). In other implementations, however, some or all offsets may be relative. For example, if the key offsets are expressed as relative values, reverse traversal through the data may be hastened.

Both the snapshot offset and the index offsets may be of the same type (i.e., both absolute or both relative), so as to allow rapid identification of the keys/key values that need to be pruned. Otherwise, determining whether a given index offset exceeds the snapshot offset (in which case the corresponding key/key value must be pruned) may require some conversion or extra calculation.

Also, in the method of FIG. 7, some or all offsets are to the start of individual data records or entries. This may facilitate a determination as to whether pruning is required for a particular key/key value, because simple comparisons of index offsets to the snapshot offset will show where pruning is required, but may slightly complicate the process of traversing the data during the pruning. In other implementations, the offsets may be to other portions of the data records, which may hasten traversal of the data during pruning.

In some other methods, some measure of the complexity or breadth of a query on data collection 450 is obtained before determining how to capture a snapshot. In some illustrative implementations in which logic configured to query data collection 450 also performs the method of capturing the snapshot, that logic may analyze the query in conjunction with creation of the snapshot (e.g., to aid its execution). In some other implementations, some other entity may perform the analysis and an indication of the estimated complexity may be received with the query.

If the query is determined to be sufficiently complex (e.g., it appears to require looking up a relatively large number of keys and/or key values), the snapshot may be taken using a process similar to that of FIG. 7, wherein a complete copy of the live data index is made and then pruned, and only afterward is the query executed (using the copy of the index).

If the query is determined to be very simplistic (e.g., only requires retrieval of data matching one value of one key), no copy of the live index may be made. Instead, the index is used to find the index offset for the one key value, and the data may be traversed (in reverse order) until data that does not belong in the snapshot is passed by (i.e., until the first record that is less than or equal to the snapshot offset is encountered), after which the query may operate.

For a query between the extremes of complex and simple, a copy of the live index may be assembled incrementally. In these cases, as each key or key value that requires lookup is encountered in the query, the corresponding key value and index offset are copied and pruning is applied as necessary to ensure the incremental index is consistent with the snapshot.

Performing Set Operations on Variable-Length Data Sequentially Stored and Indexed to Facilitate Reverse Reading In embodiments for supporting set operations on variable-length data that has been stored and indexed for reverse reading, an efficient scheme is implemented that obviates the need to create or maintain multiple copies of the data. For example, in order to find the intersection of two sets of data records (e.g., records matching specified values for multiple different keys), instead of copying the data to create (and then merge) separate data sets for each key or key value, the data may be traversed in place to find records that match the intersection criteria. In these embodiments, the data are stored and indexed as discussed in previous sections.

As described previously, index offsets 446 of index 440 in FIG. 4 can be used to find initial (e.g., the most recent) entries or data records in data collection 450 that have specified values for specified keys; thereafter, the records' key offsets identify subsequent records having the same values for the same keys. When attempting to satisfy a query that requires a set operation, and especially when values of multiple keys are at issue, one problem that can be expected while traversing the data collection is that of determining whether two entries or records that have been reached by following key offsets 406 associated with different keys are the same or different entries or records.

More particularly, a set operation may involve separate traversal of the data collection for each key or key value involved in the query and, when matching key values are found, some additional processing may be required to determine whether the values are part of the same data record or different data records. Just finding these values among the data collection is not enough; efficiently performing the necessary set operation(s) requires some analysis to determine whether a given data record satisfies or does not satisfy the query parameters.

For example, a union operation on data collection 450 may involve values of multiple different keys and/or multiple different values of a single key. To find all pertinent records, the data collection may be separately and simultaneously traversed for each key/value pair. For each key/value pair to include in the union, the corresponding index offset 446 and key offsets 406 are used to find records having the specified value for the specified key. The first time a given data entry is visited, it may be added to the solution set; if it is visited again as part of the traversal of a different key/value traversal, it can be skipped over. Thus, if the separate traversals of the data collection for different keys or key values land on the same entry, that record should be added to the result set only once.

An intersection operation on data collection 450 may also involve multiple different keys and corresponding values, and/or multiple different values of a single key if a key field can simultaneously have multiple values. Performing the intersection requires the data collection to be searched to find records that have all specified values for all specified keys, and again may involve separate, simultaneous traversals of the data collection for each key/value pair. However, only when all specified key/value pairs are found in one data record is that record added to the solution set. Thus, it will be helpful to determine when the separate traversals visit the same entry.

Similarly, a difference operation on data collection 450 may involve multiple different keys and corresponding values, and/or multiple different values of a single key if a key field can have multiple values simultaneously. Performing the difference requires the data collection to be searched to find records that have first values for a first set of keys but not second values for a second set of keys. As each data record is found that has a target value for a specified key, it is added to the solution set only if it does not have the other target value(s) for the other specified key(s). If the separate traversals for the first set of keys and the second set of keys visit the same entry as part of the difference operation, that entry should be omitted from the result set.

Figure 9:
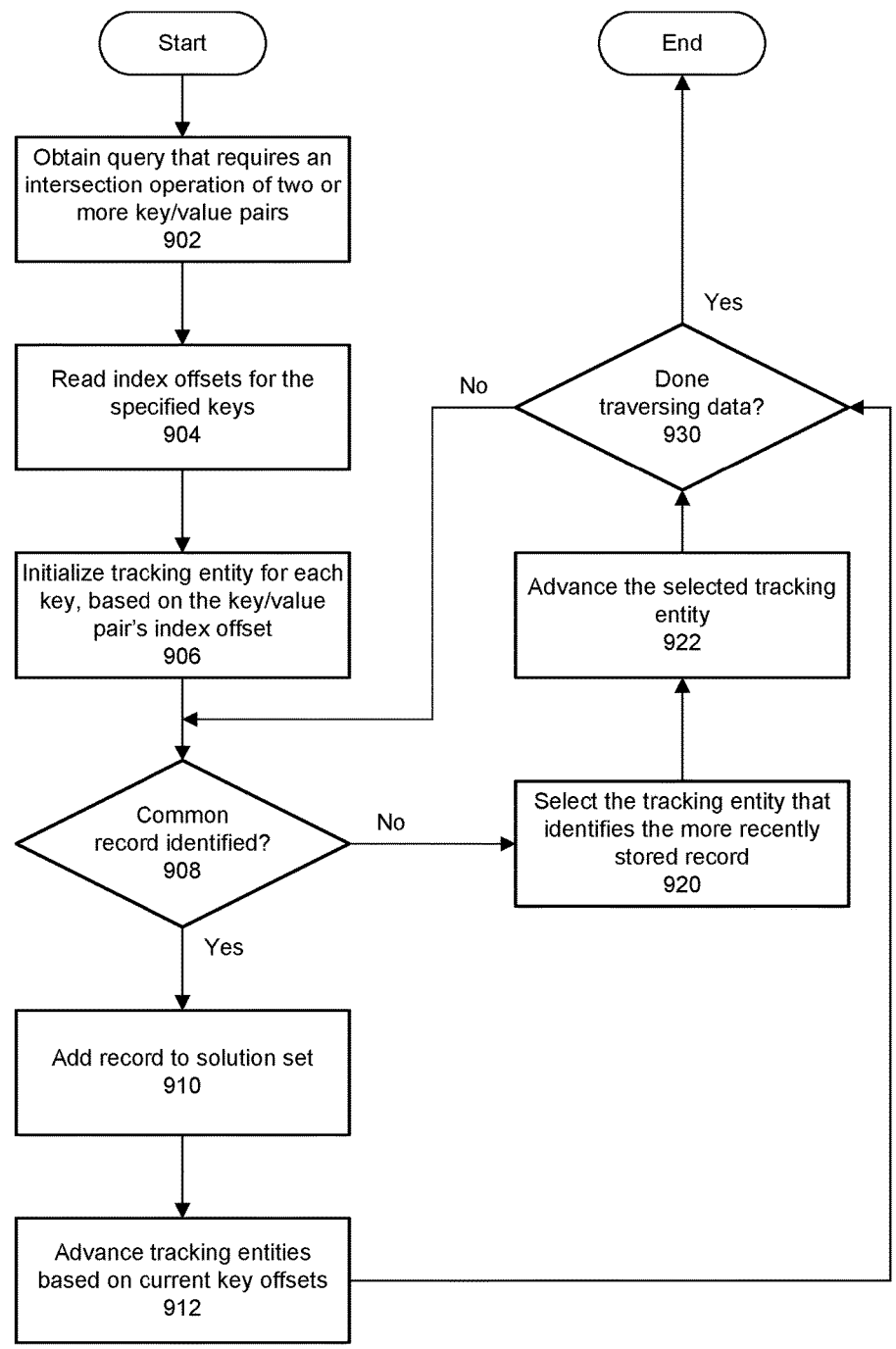
FIG. 9 is a flow chart illustrating a method of performing a set operation on variable-length data that has been stored and indexed to facilitate reverse reading, in accordance with some embodiments.

FIG. 9 is a flow chart illustrating a method of performing a set operation on variable-length data that has been stored and indexed to facilitate reverse reading, according to some embodiments. In one or more embodiments, one or more of the steps may be omitted, repeated, and/or performed in a different order. Accordingly, the specific arrangement of steps shown in FIG. 9 should not be construed as limiting the scope of the embodiments.

Although the method is described as performing an intersection operation on a data collection of variable-length data records (such as data collection 450 of FIG. 4), from the following description one of ordinary skill in the art will recognize how to perform a different set operation.

In operation 902, a query is generated or received that requires an intersection operation. For example, a member of a professional network, a social network, or some other application or service that features an online user community may wish to find other members that satisfy multiple criteria (e.g., attended a particular educational institution, worked for a particular employer, holds a particular position, has a particular job title).

The illustrated method involves the use of two criteria, meaning that all data records that have a first specified value for a first specified key field and a second specified value for a second specified key field should be included in the solution. Each specified key and its corresponding specified value may be referred to as a target key/value pair. The method is readily adaptable for use with more keys and/or with multiple values of a single key.

Thus, from the query or in association with the query, multiple key/value pairs are identified. These key/value pairs correspond to data records involved in the set operation, in that the set operation is applied to records that have the key/value pairs.

In operation 904, an index (e.g., index 440 for data collection 450 of FIG. 4) is consulted to find offsets to the most recently stored data entries that have the key/value pairs. If any of the index offsets for the specified keys are null, empty, zero, or otherwise have no data, the data collection contains no records that have the corresponding key/value pair, and the method is aborted because the intersection will be the empty set. Assuming, however, that at least one data record has each key/value pair, none of the keys' index offsets will be empty or null, and the method continues at operation 906.

In operation 906, for each key/value pair involved in the intersection, a separate tracking entity (e.g., a pointer, an offset) is initialized to track and assist the traversal of data entries having the specified value for the specified key. A first tracking entity will be associated with navigation of records having a first key/value pair, a second tracking entity will reflect navigation of records having a second key/value pair, and so on.

The initialization of a tracking entity may entail copying the value of the index offset of the tracking entity's corresponding key/value pair, which was read in operation 904. As described previously, the index offset may identify the starting address of (or offset to) the data record, the data record's metadata, the key offset corresponding to the key, or some other location in or associated with the data record or entry. Thus, when a tracking entity is said to 'identify' a data record or entry, it has a value or status that identifies a location within the data record/entry or some element of the data record/entry.

In operation 908, it is determined whether both (or all) of the tracking entities currently identify the same data entry. If so, a member of the solution set for the intersection has been found. In different implementations and/or different scenarios, this determination may be made in different ways.

For example, if a union is being calculated for different values of a single key, then the tracking entities may be co-located whenever they identify the same entry (e.g., they may point to or identify the same location of the same data entry, such as the key offset of the single key). In this scenario, just comparing the tracking entities' values or states will reveal whether they identify the same entry or record. Normally, no single record will have two different values for a single key field.

As another example, in some implementations key offsets within data entries of the data collection (e.g., offsets 406 for records 402 of data collection 450 of FIG. 4) have fixed positions within their data entries (e.g., positions 1 through N when there are N keys (N≥1)). In these implementations, each data entry identified by a tracking entity is navigated (e.g., from the key offset identified by the tracking entity) to the starting address of the first key offset, the starting address of the record's metadata, the starting address of the data record, or some other predetermined location within the data record or its metadata. The locations identified for each key are then compared. If they are the same, then the tracking entities currently identify the same data entry.

As already mentioned, key offsets of a data entry may be stored to facilitate reverse reading, which will make it easy to navigate from a given key offset to any other (earlier) portion of the same entry. Navigation to some points (e.g., the first key offset, the end of the last key offset, another key offset) is also easy if the key offsets are of fixed length in addition to being in a predetermined order.

In some other implementations, determining whether two tracking entities identify the same data entry or record involves using one of them as a reference and, from the other entity, determining whether the reference is the same data entry or record. In these implementations, the tracking entities point to (or are offsets to) key offsets corresponding to their associated keys. Thus, one of the tracking entities identifies its corresponding key offset in one data entry, while the second tracking entity identifies its corresponding key offset in a second data entry. The question is whether the two data entries are the same.

One of their locations is selected as the reference, and may be termed the 'reference' key offset, which is located in a 'reference' data entry or record. The other tracking entity's location may be termed a 'non-reference' key offset and is located in a 'non-reference' data entry or record. Then, the distance (e.g., in bytes) between the non-reference key offset in the non-reference data entry and the reference key offset in the non-reference data entry is calculated. This calculation may be trivial if the key offsets have fixed sizes, or may require traversal of the key offsets if they are not of fixed size.

Finally, based on the calculated distance, it can be determined whether the non-reference key offset and the reference key offset are in the same entry. In particular, if the difference between the non-reference key offset and the reference key offset within the non-reference data entry matches the difference between the two tracking entities' values, the tracking entities must identify the same entry or record; if not, they identify different entries.

Figure 8:
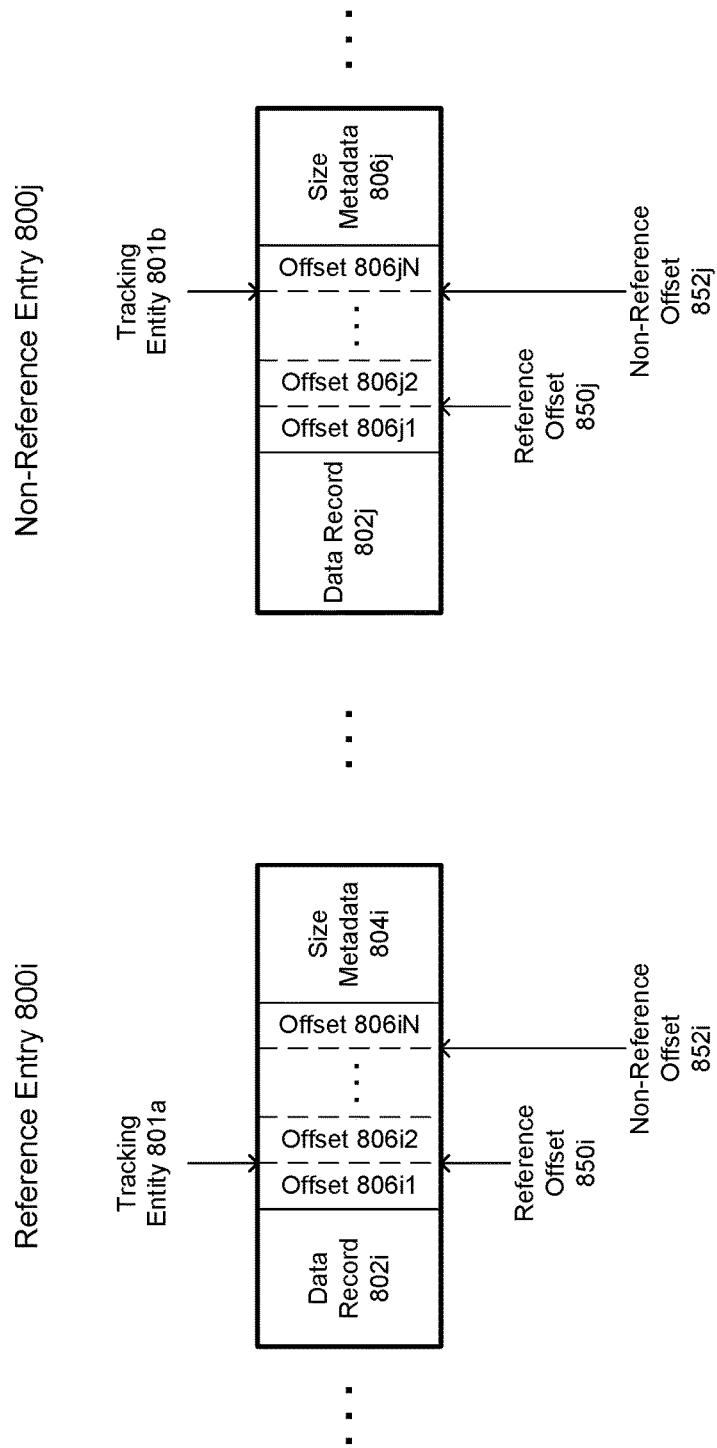
FIG. 8 is a block diagram illustrating how references may be used to determine whether two records are the same record, in accordance with some embodiments.

An example of the use of references to determine whether two data entries or records are the same is illustrated in FIG. 8. FIG. 8 depicts reference entry 800$i$ and non-reference entry 800$j$. It is unknown whether they are the same or different entries or records.

A first tracking entity 801$a$ currently identifies key offset 806$i$2 of the reference entry, while a second tracking entity 801$b$ currently identifies key offset 806$j$N of the non-reference entry. Thus, tracking entity 801$a$ is associated with key 2 and tracking entity 801$b$ is associated with key N (out of N keys).

Tracking entity 801$a$ is chosen as the reference entity, and so the second key offset of entry 800$i$ is designated reference offset 850$i$ of the reference entry, and the second key offset of entry 800$j$ is designated reference offset 850$j$ of the non-reference entry. Similarly, the $N^{th}$ key offset of entry 800$j$ is designated non-reference offset 852$j$ of the non-reference entry, while the $N^{th}$ key offset of entry 800$i$ is designated non-reference offset 852$i$ of the reference entry.

It should be noted that the actual addresses or offsets of reference offset 850$j$ and non-reference offset 852$i$ may not yet be known; they are identified because they will be used in the determination as to whether entries 800$i$ and 800$j$ are in fact the same data entry.

Then, the difference is calculated between non-reference offset 852$j$ and reference offset 850$j$ in non-reference entry 800$j$. This may be done by traversing the key offsets (e.g., through reverse-reading), by considering the number of intervening key offsets (e.g., if the key offsets are of fixed size), or in some other manner. If the key offsets are traversed, identifying the beginning of reference offset 850$j$ may inherently indicate (based on its address or offset) whether it is the same as reference offset 850$i$, in which case the determination is complete.

Otherwise, the difference can be applied to non-reference offset 852$j$ to see if it yields reference offset 850$i$ (or vice versa), in which case the entries are the same.

In some implementations or scenarios, the tracking entity chosen as the reference is the one that identifies the newer position (more recently written) within the data collection. This is appropriate, for example, when the key offsets are not stored in a manner described above that facilitates reverse reading. In particular, because it will be easier to navigate 'forward' in the data (instead of in reverse), it will be easier to calculate the distance from an earlier written key offset toward a later written key.

In some other implementations or scenarios, the tracking entity chosen as the reference may be the one that identifies the older position (less recently written) within the data collection. For example, if the key offsets were stored to facilitate reverse reading, it may be faster to navigate them in the reverse order from which they were written.

If the tracking entities identify the same data entry or record, it is added to the result set or solution set in operation 910.

In operation 912, both/all tracking entities are advanced to continue their traversal of the data collection. Specifically, the key offsets corresponding to the entities' associated keys are read and used to identify the next oldest data entry or record that has the target key/value pair, if one exists. Those key offsets may be used as the new values of the tracking entities. The method then advances to operation 930.

In operation 920, the tracking entities do not identify the same data entry; therefore, one of them must be advanced to the next record having the target key/value pair. In order to do so, the tracking entity that currently identifies the newest entry or position within the data collection is selected. A simple comparison of the entities' values may suffice for this determination. By always advancing the tracking entity that identifies the newest record, the entities' traversal of the data collection will ensure that they will simultaneously visit every entry or record that should be included in the result set.

In operation 922, the selected tracking entity is advanced, meaning that the key offset of the entity's corresponding key is read and used as the new value of the tracking entity. Multiple tracking entities may be updated simultaneously or in parallel if they all currently point to the same data entry and that entry was stored more recently than any other data entry currently identified by other tracking entities.

In operation 930, the apparatus or system performing the method determines whether it has completed its data traversal for the immediate query. Illustratively, the method may be terminated by completely traversing the data collection, in which case one or more tracking entities will have been assigned a value (e.g., in operation 912 or operation 922) that is null, zero, or otherwise indicates that the collection has no more records with the entity's target key/value pair. Also, however, or instead, the method may terminate upon satisfaction of a boundary condition.

For example, if only a target number of results is desired, the method may stop when that number of data records is obtained. As another example, a maximum number of visited data entries or records may be identified such that the method ends when that number of entries has been visited. As yet another example, if the data entries have timestamps, and the query has a time-based restriction, the method may end when a data record identified by a tracking entity is outside the specified time window.

Thus, in operation 930, a test may be conducted to determine whether any boundary or termination condition is satisfied. If so, the results are reported (if there are any results) and the method ends.

Otherwise, the method returns to operation 908 to again determine if the tracking entities identify the same data record.

Other set operations will vary in terms of how members of the result set are identified. For example, a union operation may entail traversing each target key's chain of records, starting from the index offset corresponding to the target value and through any number of key offsets, and adding each record to the result set if it was not already added. A method for performing a union operation may or may not determine whether the target keys' tracking entities identify the same entry, and may or may not always advance the tracking entity that identifies the most recently stored data record. Doing so may help avoid adding duplicates to the result set, but may or may not be faster than simply determining whether each tracking entity's currently identified entry or record is already in the result set.

A method of performing a difference operation may operate to find records that have any of a first set of values for a first set of keys (which have associated first tracking entities) but not any value in a second set of values for a second set of keys (which have associated second tracking entities). Thus, the first set of keys and first set of tracking entities will identify records that could be added to the result set, while the second set of keys and second set of tracking entities will identify records that should not be added to the result set. Based on the tracking entities' current positions/locations as they traverse the data collection, a determination is made as to whether at least one of the first tracking entities and at least one of the second tracking entities identify the same record. If so, the record is excluded from the result set.

Otherwise: (a) if the newest (most recently stored) record identified by the tracking entities is identified only by one or more first tracking entities (i.e., and not by any second tracking entities), the record is added to the result set and all tracking entities that identify the record are advanced; or (b) if the newest (most recently stored) entry identified among all the tracking entities is identified by one or more second tracking entities, all tracking entities that identify the entry are advanced. Then another determination is made as to whether the tracking entities identify the same record.

Performing Update Operations on Variable-Length Data Sequentially Stored and Indexed to Facilitate Reverse Reading In embodiments for performing update transactions (e.g., multiple concurrent write operations), an efficient scheme is implemented to conduct each transaction atomically. All data included in a single transaction will be written contiguously unless the operation fails; in other words, the operation is conducted in an all-or-none fashion. A previous section described how snapshots of stored data may be captured, and snapshots may be taken for some or all update transactions.

In these embodiments, for example, when an update (i.e., write) transaction is received with one or more data records (or data record portions) to be written, a snapshot as of the time of the transaction (e.g., based on a timestamp associated with the transaction) may be taken. In addition, the data records are written to a temporary data log before they will be added to the live data repository. The data are then configured as necessary to be consistent with the expected location, in the live data repository, to which the data will be copied, which may be the end offset (e.g., end offset 490 of FIG. 4). This may entail updating key offsets within the data so that, when the new data records are written (e.g., starting at the end offset), their key offsets will correctly identify the preceding (previously stored) records that have the same key values.

More particularly, and as described in previous sections, each data record stored in the repository may include one or more key offsets (e.g., one for each key field of the data store); each key offset corresponds to one key field and identifies the previously stored record that has the same value for that key. Thus, the key offsets of a set of new data records of a given update must be made consistent with the existing data before the new records can be copied from the temporary log and into the repository.

As discussed below, if other new data records are stored in the repository after the given update's snapshot is taken and before the given update's data are copied from the temporary log to the repository, the end offset of the repository will now differ, and the contents of the temporary log may be further modified to ensure the new data are consistent with the other data just added to the data repository.

Figure 10:
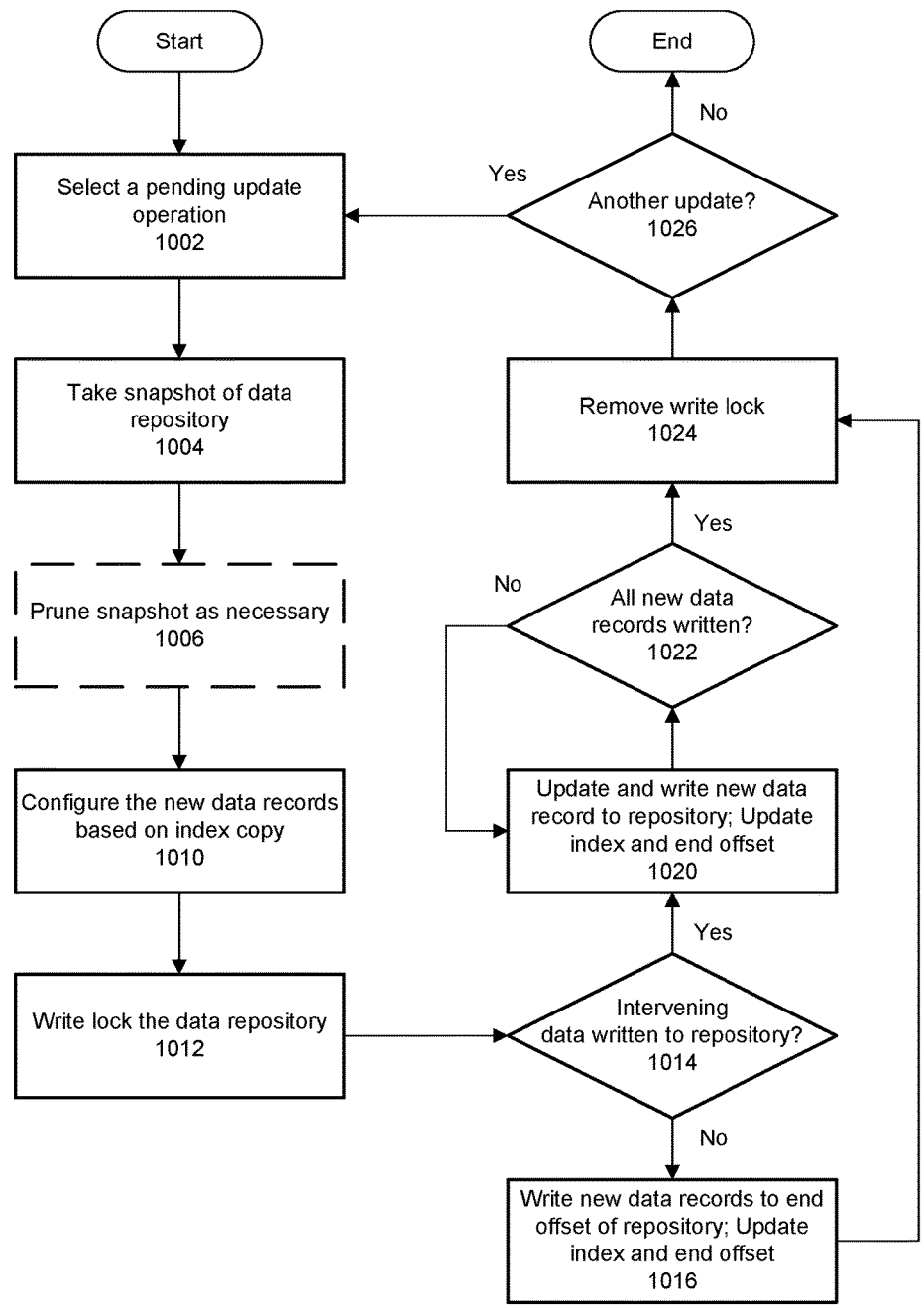
FIG. 10 is a flow chart illustrating a method of performing an update operation on variable-length data that has been stored and indexed to facilitate reverse reading, in accordance with some embodiments.

FIG. 10 is a flow chart illustrating a method of performing update or write operations on variable-length data that has been stored and indexed to facilitate reverse reading, according to some embodiments. In one or more embodiments, one or more of the steps may be omitted, repeated, and/or performed in a different order. Accordingly, the specific arrangement of steps shown in FIG. 10 should not be construed as limiting the scope of the embodiments.

In operation 1002, two or more update operations are pending; each will be conducted as indicated. One of them is selected, and comprises one or more new data records to be written to the repository. It may be noted that, in some embodiments, the indicated manner of performing an update may be used for some or all update operations, regardless of whether there are any additional updates pending at the same time. Thus, the remainder of the illustrated method may be applied in parallel for multiple update operations.

In operation 1004, a snapshot is captured in a manner described in a previous section (or in some other manner), which includes making at a copy of the index that includes index offsets for all key values in the new data records. Because the snapshot is for use in appending new data to the data collection, the snapshot offset may be the end offset of the data collection. The entire live index may be copied (e.g., index 440 of FIG. 4), or just a portion (e.g., index offsets for the key values included in the new data records. As will be seen below, however, it may be efficient in some implementations to make a complete copy, update that copy during application of the write operation, and then replace the live index with the copy.

In optional operation 1006, if the copy of the index includes any index offsets that exceed the snapshot offset, they are pruned to identify earlier records (i.e., records stored before the snapshot offset).

In operation 1010, the new data records are formatted as if they were to be stored at the snapshot offset. In particular, their key offsets are configured as necessary to continue, for each pertinent key value, the chain of references leading from the most recently stored record having that value to the oldest record having the key value.

For example, the value of each key offset of the first of the data records to be written is copied from the corresponding index offset of the copy of the index, and those index offsets are updated to identify the first data record. Each following record is then modified in the same manner so that after the final record to be stored is configured, the copy of the index and the records' key offsets are synchronized.

It may be recalled that the new data records will be written consecutively to the data repository. The order of the records within the set of data records may be based on timestamp, the order in which they were obtained as part of the update operation, or may be set in some other manner.

In operation 1012, the data repository is locked in preparation for writing the new data records to the repository. In some embodiments, locking the data repository may involve locking the end offset value (e.g., end offset 490 of FIG. 4), because in order to append data to the repository, the end offset must be updated; therefore, no data may be added to the repository without having a (write) lock on the end offset. Similarly, in some implementations the index may not be written to without having a lock on the end offset.

In operation 1014, a determination is made as to whether other data was written to the repository since the new data records were configured for storage. This determination may simply involve determining whether the current value of the end offset is the same as it was when the snapshot was captured. Or, similarly, this may involve determining whether the current value of the end offset is the same as the starting offset at which it was assumed the first new data record would be written.

In operation 1016, no intervening data were added to the repository. Therefore, the new data records are written to data entries added to the data repository at the end offset, the live index is updated, and the end offset is updated. During update of the live index, discrete portions of the live index (e.g., index offsets) may simply be updated as required to accommodate the new data records or, in some alternative embodiments, the copy of the index used to configure the new data records (and which was updated to reflect their final configuration) can be swapped for or copied over the live index. After operation 1016, the method advances to operation 1024.

In operation 1020, intervening data were added to the repository, and so the new data records cannot be stored without their key offsets first being updated. Therefore, the first new record to be written is updated (e.g., its key offsets are updated) based on the live version of the index, and is appended to the repository, in a new data entry written at the end offset. As indicated above, updating the record may involve updating each of its key offsets to match the value of the corresponding index offset in the live index. Similarly, the index offset of the live index may be updated to the current value of the end offset (or to some other offset that identifies the new record), and then the end offset is updated.

In some implementations, a copy of the live index may be used to configure each new data record and store it, in turn, and the live index may not be updated (or replaced) until all of the new records have been stored (e.g., by swapping it for the index copy). This may cause entities reading the index and data repository in the meantime to encounter inconsistencies. For example, an index offset in the live index that is examined as part of a read operation may be greater than a current value of the end offset if a write operation is in process but has not yet completed. However, the entities (e.g., the process performing the read operation) will understand how to resolve an inconsistency by, for example, pruning a snapshot to omit data records beyond the snapshot's offset.

In operation 1022, if all the new records have been written to the data repository, the method advances to operation 1024; otherwise, the method returns to operation 1020 to prepare and store the next new record.

In some implementations, instead of configuring and writing each new record separately (operations 1020-1022), the entire set of new data records may be updated together to form a full updated set of new records (e.g., as described above as part of operation 1010), based on the live index or a fresh snapshot or copy of the live index. Then the entire set of records could be written at once to the current end offset, and the live index and the end offset updated. Moreover, instead of updating individual portions of the live index, the copy of the index used in the final preparation of the new set of data records, which would have been updated to reflect the preparation, could be swapped for the live copy (or copied over it).

In operation 1024, the lock on the end offset is released.

In operation 1026, if another update operation is pending, the method may return to operation 1002; otherwise, the method ends.

An Illustrative Apparatus for Sequentially Storing Variable-Length Data

Figure 11:
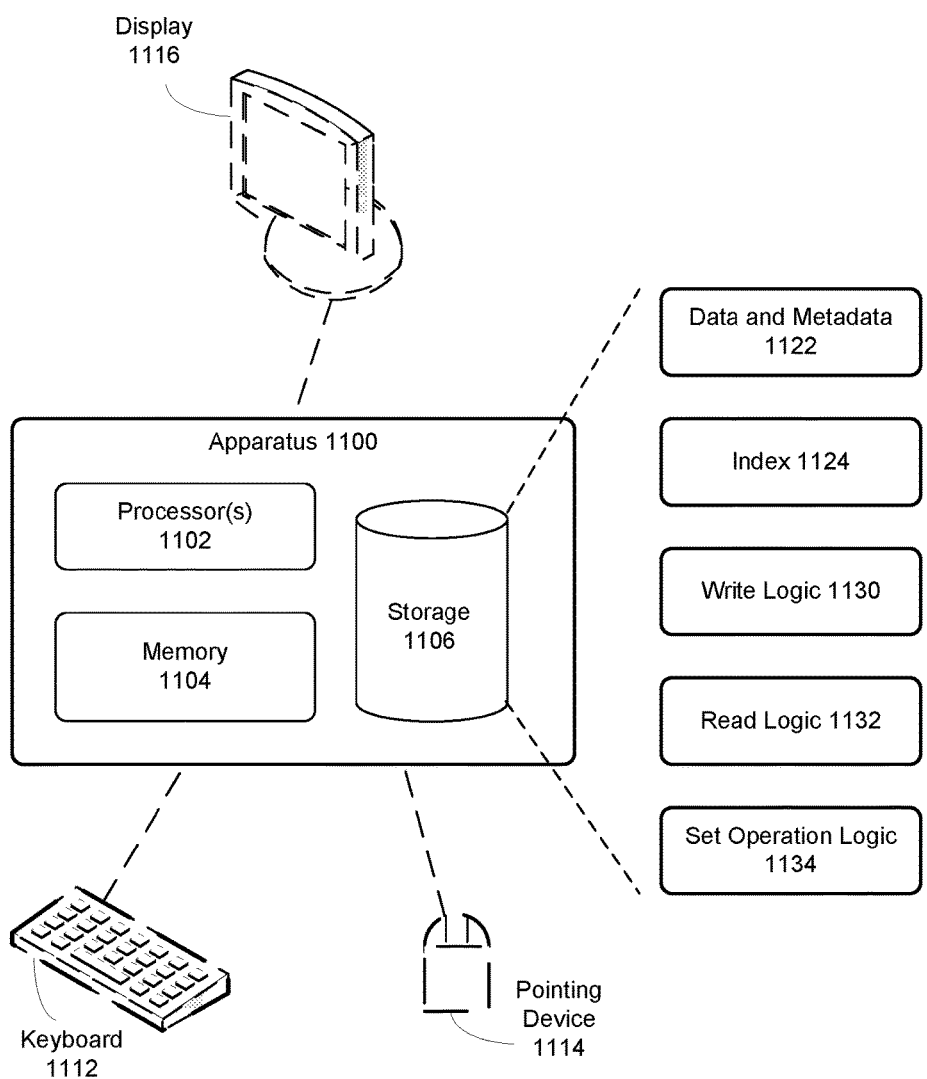
FIG. 11 depicts an apparatus for facilitating reverse reading of sequentially stored variable-length data and/or indexing and sequentially storing such data, in accordance with some embodiments.

FIG. 11 depicts an apparatus for facilitating reverse reading of sequentially stored variable-length data, indexing and sequentially storing such data, and/or capturing snapshots of the data, according to some embodiments.

Apparatus 1100 of FIG. 11 includes processor(s) 1102, memory 1104, and storage 1106, which may comprise any number of solid-state, magnetic, optical, and/or other types of storage components or devices. Storage 1106 may be local to or remote from the apparatus. Apparatus 1100 can be coupled (permanently or temporarily) to keyboard 1112, pointing device 1114, and display 1116.

Storage 1106 is (or includes) a data repository that stores data and metadata 1122. Data and metadata 1122 includes variable-length data records that are stored sequentially with corresponding size metadata. Each record includes multiple keys and corresponding values (some of which may be null or undefined).

As described above, for example, the size metadata for a given record may include one or more bytes (or other storage units) that identify the length of the record (e.g., with variable-length quantity (VLQ) encoding). If more than one storage unit (or byte) is needed to store the record length, the record's size metadata includes an additional byte that identifies the size/length of the record length (e.g., the number of bytes used to store the record length). When the record length is stored with VLQ encoding, the most significant bit of the additional byte is set to one so that, during reverse reading, the reader can quickly determine that the byte does not store the record length, but rather the length (e.g., number of bytes) of the record length (or 'size of the size').

In addition, within each record, one or more key offsets are stored that store offsets to other records having the same values for the same keys (if any other such records are stored). Thus, for a given value for a given key, corresponding key offsets associated with records having that key value can be quickly identified and/or traversed.

Index 1124 is an index to the data records, such as an index described herein that identifies, for each known value for each key field, a first (e.g., most recently stored) record that has that key value. Some or all of this index may also (or instead) reside in memory 1104. Index 1124 (and/or memory 1104) may include one or more full and/or partial copies of a live index.

Storage 1106 also stores logic and/or logic modules that may be loaded into memory 1104 for execution by processor(s) 1102, including write logic 1130, read logic 1132, and set operation logic 1134. In other embodiments, these logic modules may be aggregated or divided to combine or separate functionality as desired or as appropriate. For example, the write logic and read logic may be combined into a larger logic module that handles some or all input/output for the data repository.

Write logic 1130 comprises processor-executable instructions for writing to data 1122 a new data record and accompanying/corresponding key offsets and size metadata. Thus, for each new set of data to be stored, write logic 1130 writes the data, writes a key offset for each key field, determines the length of the new data record (possibly including the key offsets), writes the length after the data and, if more than one byte (or other threshold) is required to store the length, writes the additional size metadata byte (e.g., the 'size of the size' byte). Write logic 1130 may also be responsible for updating an index associated with the data (e.g., to store offsets to the new data record (or the new data record's key offsets) among the index offsets).

In addition, in order to maintain the integrity of the data, write logic 1130 may first prepare new records to be stored by obtaining a copy of the live index, configuring the records (e.g., the records' key offsets) based on the index (and update the index copy accordingly), locking the data, appending the new records (with further updates if/as necessary), updating the end offset of the data, updating (e.g., or replacing) the live index, and releasing the lock.

Read logic 1132 comprises processor-executable instructions for forward-reading and/or reverse-reading data and/or metadata 1122. While reading the data in reverse order, for each record the reader logic first reads the last byte of the corresponding size metadata. If its most significant bit is zero, the byte stores the record's length and the reader can quickly calculate the offset to the start of the record and move there to read the record. If the most significant bit of the last byte is one, the rest of the last byte identifies the size of (e.g., number of bytes used to store) the record length. The reader logic can therefore quickly find the offset of the beginning of the length, read the length, and use it to calculate the start of the record.

Read logic 1132 may use a portion of index 1124 to locate a first (e.g., most recently stored) record having particular values for one or more specified or target keys or key fields. In particular, the first record is located by using an index offset for a key field, after which that record's key offsets are used to quickly find other records satisfying the same criteria.

Set operation logic 1134 comprises processor-executable instructions for performing set operations on data 1122. Various types of set operations may be supported, such as unions, intersections, and differences. Each operation is performed on two or more sets of data records, wherein each set of records has a common key/value pair (i.e., the same value for the same key field).

To facilitate a set operation, the set operation logic initializes a tracking entity for each key/value pair participating in the set operation, by setting them equal to their corresponding index offsets (e.g., obtained from index 1124). Thereafter, each tracking entity is used to identify or traverse records having the associated key/value pairs. The set operation may be conducted during the traversal, which may involve determining whether multiple tracking entities identify the same record, adding a record to a result of the operation if it qualifies, and advancing each tracking entity to the next record having its key/value pair at the appropriate time.

Set operation logic 1134 may be divided into separate logic modules, such as an initialization module and/or modules for each set operation. Apparatus 1100 may alternatively be termed or implemented as a module, mechanism, or other type of system component.

An environment in which one or more embodiments described above are executed may incorporate a data center, a general-purpose computer or a special-purpose device such as a hand-held computer or communication device. Some details of such devices (e.g., processor, memory, data storage, display) may be omitted for the sake of clarity. A component such as a processor or memory to which one or more tasks or functions are attributed may be a general component temporarily configured to perform the specified task or function, or may be a specific component manufactured to perform the task or function. The term "processor" as used herein refers to one or more electronic circuits, devices, chips, processing cores and/or other components configured to process data and/or computer program code.

Data structures and program code described in this detailed description are typically stored on a non-transitory computer-readable storage medium, which may be any device or medium that can store code and/or data for use by a computer system. Non-transitory computer-readable storage media include, but are not limited to, volatile memory; non-volatile memory; electrical, magnetic, and optical storage devices such as disk drives, magnetic tape, CDs (compact discs) and DVDs (digital versatile discs or digital video discs), solid-state drives, and/or other non-transitory computer-readable media now known or later developed.

Methods and processes described in the detailed description can be embodied as code and/or data, which may be stored in a non-transitory computer-readable storage medium as described above. When a processor or computer system reads and executes the code and manipulates the data stored on the medium, the processor or computer system performs the methods and processes embodied as code and data structures and stored within the medium.

Furthermore, the methods and processes may be programmed into hardware modules such as, but not limited to, application-specific integrated circuit (ASIC) chips, field-programmable gate arrays (FPGAs), and other programmable-logic devices now known or hereafter developed. When such a hardware module is activated, it performs the methods and processed included within the module.

The foregoing embodiments have been presented for purposes of illustration and description only. They are not intended to be exhaustive or to limit this disclosure to the forms disclosed. Accordingly, many modifications and variations will be apparent to practitioners skilled in the art. The scope is defined by the appended claims, not the preceding disclosure.

What is claimed is:

1. A method of performing an update operation on a collection of data records stored in a manner that facilitates reverse reading,
wherein an index of the data records comprises:
for each of multiple keys, one or more values of the key; and
for each value, a corresponding index offset to a most recent data record in the collection having the key value;
the method comprising:
obtaining a set of new records associated with the update operation;
identifying as an assumed write location for the set of new records an end offset of the collection of data records at a time the set of new records was obtained;
configuring the set of new records such that each new record includes, for each of the multiple keys, a corresponding key offset to a previous record having the same value as the new record for the key;
determining whether a current write location matches the assumed write location;
when the current write location does not match the assumed write location, updating the set of new records based on the current write location;
writing the set of new records at the current write location; and
updating the index.

2. The method of claim 1, wherein:
each new record includes values for one or more of the keys; and
said configuring the set of new records comprises, for each new record in the set of new records:
retrieving, from a copy of the index, the index offsets corresponding to the key values included in the new record;
writing the retrieved index offsets as the key offsets within the new record; and
updating the copy of the index to replace the retrieved index offsets with offsets to the new record.

3. The method of claim 2, wherein said configuring further comprises, for each new record in the set of new records:
updating the assumed write location.

4. The method of claim 2, wherein said updating the index comprises:
replacing the index with the copy of the index.

5. The method of claim 2, wherein said updating the set of new records comprises, for each new record:
obtaining, from the index or another copy of the index, the index offsets corresponding to the key values included in the new record;
writing the obtained index offsets as the key offsets within the new record;
updating the index or the other copy of the index to replace the obtained index offsets with offsets to the new record; and
updating the current write location of the collection of data records after the new record is written to the current write location.

6. The method of claim 1, further comprising:
creating a copy of the index.

7. The method of claim 1, further comprising:
prior to said determining, locking the collection of data records; and
after the index is updated, unlocking the collection of data records.

8. The method of claim 7, wherein locking the collection comprises locking an end offset that identifies the current write location.

9. An apparatus for performing an update operation on a collection of data records stored in a manner that facilitates reverse reading,
wherein an index of the data records comprises:
for each of multiple keys, one or more values of the key; and
for each value, a corresponding index offset to a most recent data record in the collection having the key value;
the apparatus comprising:
one or more processors; and
memory storing instructions that, when executed by the one or more processors, cause the apparatus to:
obtain a set of new records associated with the update operation;
identify as an assumed write location for the set of new records an end offset of the collection of data records at a time the set of new records was obtained;
configure the set of new records such that each new record includes, for each of the multiple keys, a corresponding key offset to a previous record having the same value as the new record for the key;
determine whether a current write location matches the assumed write location;
when the current write location does not match the assumed write location, update the set of new records based on the current write location;
write the set of new records at the current write location; and
update the index.

10. The apparatus of claim 9, wherein:
each new record includes values for one or more of the keys; and
said configuring the set of new records comprises, for each new record in the set of new records:
retrieving, from a copy of the index, the index offsets corresponding to the key values included in the new record;
writing the retrieved index offsets as the key offsets within the new record; and
updating the copy of the index to replace the retrieved index offsets with offsets to the new record.

11. The apparatus of claim 10, wherein said configuring further comprises, for each new record in the set of new records:
updating the assumed write location.

12. The apparatus of claim 10, wherein said updating the index comprises:
replacing the index with the copy of the index.

13. The apparatus of claim 10, wherein said updating the set of new records comprises, for each new record:
obtaining, from the index or another copy of the index, the index offsets corresponding to the key values included in the new record;
writing the obtained index offsets as the key offsets within the new record;
updating the index or the other copy of the index to replace the obtained index offsets with offsets to the new record; and
updating the current write location of the collection of data records after the new record is written to the current write location.

14. The apparatus of claim 9, wherein the memory further stores instructions that, when executed by the one or more processors, cause the apparatus to:
- prior to said determining, lock the collection of data records; and
- after the index is updated, unlock the collection of data records.

15. The apparatus of claim 14, wherein locking the collection comprises locking an end offset that identifies the current write location.

16. A system for performing an update operation on a collection of data records stored in a manner that facilitates reverse reading, the system comprising:
- at least one processor;
- an index, comprising:
  - for each of multiple keys, one or more values of the key; and
  - for each value, a corresponding index offset to a most recent data record in the collection having the key value; and
- an update module comprising a non-transitory computer-readable medium storing instructions that, when executed, cause the system to:
  - obtain a set of new records associated with the update operation;
  - identify as an assumed write location for the set of new records an end offset of the collection of data records at a time the set of new records was obtained;
  - configure the set of new records such that each new record includes, for each of the multiple keys, a corresponding key offset to a previous record having the same value as the new record for the key;
  - determine whether a current write location matches the assumed write location;
  - when the current write location does not match the assumed write location, update the set of new records based on the current write location;
  - write the set of new records at the current write location; and
  - update the index.

17. The system of claim 16, wherein:
- each new record includes values for one or more of the keys; and
- said configuring the set of new records comprises, for each new record in the set of new records:
  - retrieving, from a copy of the index, the index offsets corresponding to the key values included in the new record;
  - writing the retrieved index offsets as the key offsets within the new record; and
  - updating the copy of the index to replace the retrieved index offsets with offsets to the new record.

18. The system of claim 17, wherein said updating the index comprises:
- replacing the index with the copy of the index.

19. The system of claim 17, wherein said updating the set of new records comprises, for each new record:
- obtaining, from the index or another copy of the index, the index offsets corresponding to the key values included in the new record;
- writing the obtained index offsets as the key offsets within the new record;
- updating the index or the other copy of the index to replace the obtained index offsets with offsets to the new record; and
- updating the current write location of the collection of data records after the new record is written to the current write location.

20. The system of claim 16, wherein the non-transitory computer-readable medium of the update module further stores instructions that, when executed, cause the system to:
- prior to said determining, lock the collection of data records; and
- after the index is updated, unlock the collection of data records;
- wherein locking the collection comprises locking an end offset that identifies the current write location.

* * * * *